(12) United States Patent
Tarchala

(10) Patent No.: US 12,262,283 B2
(45) Date of Patent: Mar. 25, 2025

(54) PERSONAL MOBILITY DEVICE USAGE-RECOMMENDATION BASED ON USER ACTIVITY TRACKING

(71) Applicant: Honda Motor Co., Ltd., Tokyo (JP)

(72) Inventor: Christopher John Tarchala, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 449 days.

(21) Appl. No.: 17/691,430

(22) Filed: Mar. 10, 2022

(65) Prior Publication Data

US 2023/0292090 A1 Sep. 14, 2023

(51) Int. Cl.
| | |
|---|---|
| H04W 4/029 | (2018.01) |
| G01C 21/34 | (2006.01) |
| G01C 22/02 | (2006.01) |
| G06N 3/04 | (2023.01) |
| G06N 3/08 | (2023.01) |
| H04W 4/021 | (2018.01) |

(52) U.S. Cl.
CPC ........ *H04W 4/029* (2018.02); *G01C 21/3453* (2013.01); *G01C 22/025* (2013.01); *G06N 3/04* (2013.01); *G06N 3/08* (2013.01); *H04W 4/021* (2013.01)

(58) Field of Classification Search
CPC .......................... G01C 21/3453; H04W 4/021
See application file for complete search history.

(56) References Cited

U.S. PATENT DOCUMENTS

| | | | |
|---|---|---|---|
| 8,560,371 B2 | 10/2013 | Levitt | |
| 8,949,022 B1 | 2/2015 | Fahrner et al. | |
| 9,070,119 B2 | 6/2015 | Catipon, Jr. et al. | |
| 9,194,955 B1 | 11/2015 | Fahrner et al. | |
| 9,749,803 B2 | 8/2017 | Huang | |
| 10,228,258 B2 | 3/2019 | Mach et al. | |
| 10,796,697 B2 | 10/2020 | Somech et al. | |
| 11,468,476 B1 * | 10/2022 | Lundsgaard | ..... H04N 21/23424 |

(Continued)

FOREIGN PATENT DOCUMENTS

| | | |
|---|---|---|
| GB | 2593933 A | 10/2021 |
| JP | 2016076044 A | 5/2016 |

*Primary Examiner* — Fabricio R Murillo Garcia
(74) *Attorney, Agent, or Firm* — Aaron Fong; American Honda Motor Co., Inc.

(57) ABSTRACT

An electronic device and a method for generating personal mobility device-usage recommendations based on user activity tracking is provided. The electronic device monitors a first set of activities associated with a user. The electronic device determines first information indicating a first time period associated with the monitored first set of activities. The electronic device receives second information indicating a second time period associated with a usage of a personal mobility device to perform a second set of activities. The electronic device compares the determined first information with the received second information. The first set of activities are associated with the second set of activities. The electronic device further generates recommendations associated with the usage of the personal mobility device by the user, based on the comparison of the determined first information with the received second information. The electronic device controls a display device to display the generated recommendations.

21 Claims, 8 Drawing Sheets

(56) References Cited

U.S. PATENT DOCUMENTS

| | | | |
|---|---|---|---|
| 2012/0089465 A1 | 4/2012 | Froloff | |
| 2014/0365484 A1* | 12/2014 | Freeman | H04W 4/21 |
| | | | 707/736 |
| 2015/0095197 A1* | 4/2015 | Eramian | G06Q 30/0629 |
| | | | 705/26.64 |
| 2016/0003637 A1* | 1/2016 | Andersen | G01C 21/362 |
| | | | 701/519 |
| 2016/0180846 A1* | 6/2016 | Lee | B60R 16/0373 |
| | | | 704/251 |
| 2017/0061474 A1 | 3/2017 | Bastide et al. | |
| 2019/0248439 A1 | 8/2019 | Wang | |
| 2021/0285784 A1* | 9/2021 | Mathada | G01C 21/3617 |
| 2021/0342913 A1* | 11/2021 | Chow | G06N 3/08 |

\* cited by examiner

PERSONAL MOBILITY DEVICE USAGE-RECOMMENDATION BASED ON USER ACTIVITY TRACKING

BACKGROUND

Advancements in the fields of electronics and information technology have led to the development of various techniques for analytics and recommendation generation, to promote usage of different products associated with users. The products may collect data associated with a usage of the products by the users. The collected data may be compiled and analyzed by use of data processing techniques to generate product usage statistics and determine a usage pattern of the products. The product usage statistics and the usage pattern may be used to determine user interests and/or user preferences, which may be used to develop product enhancements to further enrich user experiences associated with the product. In certain situations, the user interests and/or the user preferences, determined based on the usage statistics or usage patterns, may not provide satisfactory insights to product research & development (R&D) teams, marketing teams, and the users themselves to promote the sale and usage of the products.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic device for generation of personal mobility device usage-recommendations based on user activity tracking is provided. The electronic device may include circuitry. The circuitry may be configured to monitor a first set of activities associated with a user. The circuitry may be further configured to determine first information indicating a first time period associated with the monitored first set of activities. The circuitry may be further configured to receive second information indicating a second time period associated with a usage of a personal mobility device to perform a second set of activities. The circuitry may be further configured to compare the determined first information with the received second information. The first set of activities may be associated with the second set of activities. The circuitry may be further configured to generate one or more recommendations associated with the usage of the personal mobility device by the user. The one or more recommendations may be generated based on the comparison of the determined first information with the received second information. The circuitry may be further configured to control a display device to display the generated one or more recommendations.

According to another embodiment of the disclosure, a method for generating personal mobility device usage-recommendations based on user activity tracking is provided. The method may include monitoring a first set of activities associated with a user. The method may further include determining first information indicating a first time period associated with the monitored first set of activities. The method may further include receiving second information indicating a second time period associated with a usage of a personal mobility device to perform a second set of activities. The method may further include comparing the determined first information with the received second information. The first set of activities may be associated with the second set of activities. The method may further include generating one or more recommendations associated with the usage of the personal mobility device by the user, based on the comparison of the determined first information with the received second information. The method may further include controlling a display device to display the generated one or more recommendations.

According to another embodiment of the disclosure, a non-transitory computer-readable medium is provided. The non-transitory computer-readable medium may have stored thereon computer implemented instructions that, when executed by an electronic device, causes the electronic device to execute operations. The operations may include monitoring a first set of activities associated with a user. The operations may further include determining first information indicating a first time period associated with the monitored first set of activities. The operations may further include receiving second information indicating a second time period associated with a usage of a personal mobility device to perform a second set of activities. The operations may further include comparing the determined first information with the received second information, wherein the first set of activities are associated with the second set of activities. The operations may further include generating one or more recommendations associated with the usage of the personal mobility device by the user, based on the comparison of the determined first information with the received second information. The operations may further include controlling a display device to display the generated one or more recommendations.

Figure 1:
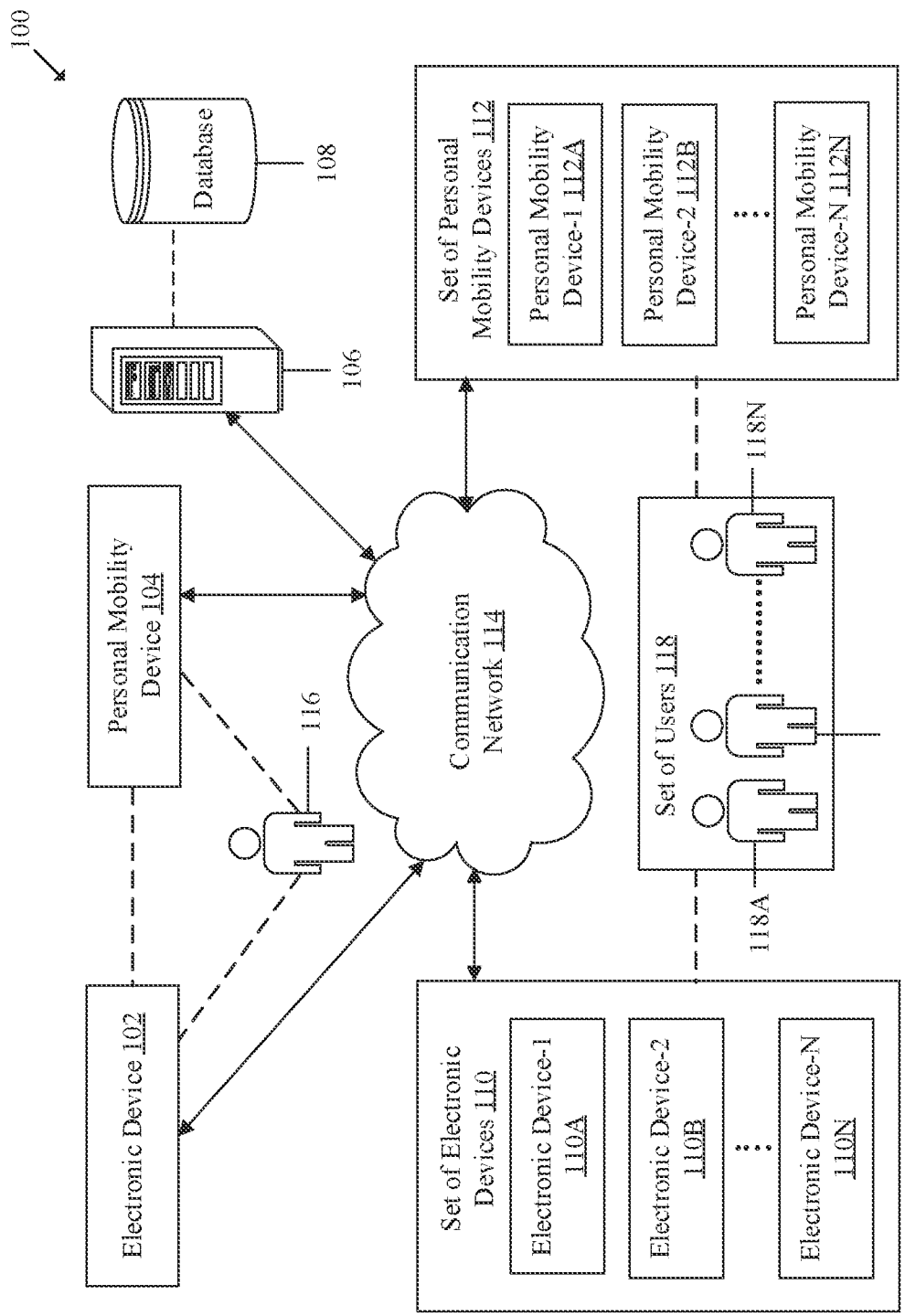
FIG. 1 is a block diagram that illustrates an exemplary network environment for generation of recommendations associated with usage of a personal mobility device based on user activity tracking, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed electronic device and method for personal mobility device-usage recommendations based on user activity tracking. Exemplary aspects of the disclosure may provide an electronic device (such as a computer, a laptop, a mobile phone, smart phone, and so on) that may be configured to monitor a first set of activities (such as a standing activity, a running activity, or a sitting activity) associated with a user. The electronic device may be further configured to determine first information indicating a first time period (for example time spent) associated with the monitored first set of activities. The electronic device may be further configured to receive second information indicating a second time period associated with a usage of a personal mobility device (such as a scooter, a personal transporter, an electric skateboard, a bicycle, a wheelchair, and so on) to perform a second set of activities (such as a traveling activity). The electronic device may be further configured to compare the determined first information with the received second information. The electronic device may be further configured to generate one or more recommendations associated with the usage of the personal mobility device by the user, based on the comparison of the determined first information with the received second information. The electronic device may be further configured to control a display device (such as a television, a computer screen, a laptop screen, a mobile phone screen, and so on) to display the generated one or more recommendations.

Typically, product usage information may be collected from multiple users of different types of products for market survey, product enhancement, product promotion, and so on. Conventionally, analytics may be performed based on the product usage information independent of other factors that may affect product demand and product value. If the product usage information indicates that frequency of usage of a product is low or if a time period associated with a usage of the product is less, certain conclusions may be drawn. For example, the conclusions may be such as, 'user is not interested in the product', 'the product does not have one or more features expected by the user, or 'the product needs to be enhanced'. Such conclusions may not indicate the actual cause of low or minimal usage of the product. For example, the user might be interested to use the product, still, the user may not use the product due to his/her involvement in other activities. This may further lead to outcomes such as, unnecessary expenditure on non-effective advertisements of products, or launch of new products with features that may not be in demand. Such outcomes may ultimately lead to wastage of resources in terms of funds, research effort, and/or degradation of user experience.

On the other hand, the disclosed electronic device may monitor a user's activities over a time period. The electronic device may receive usage information of a particular product during the time period. The electronic device may further compare the user's engagement in the monitored activities with respect to the usage information of the product, to determine insights that may be used to promote the product. For example, the product may be a personal mobility device. The compared parameters may include a time period associated with the user's activities and a time period associated with usage of the personal mobility device by the user. The comparison may result in a determination of an association between the user's activities and the usage of the personal mobility device by the user. For example, if the time period associated with the user's activities is high compared to the time period associated with the usage of the personal mobility device, the electronic device may automatically generate one or more recommendations that may encourage the user to divert certain time towards the usage of the product as compared to the use of the time for user's other activities. Thus, the usage of the product may be promoted as compared to the other activities of the user. The product usage may thereby be promoted without an outlay of expenses for additional advertisements, offers, and research and development resources.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for generation of recommendations associated with usage of a personal mobility device based on user activity tracking, in accordance with an embodiment of the disclosure. With reference to FIG. 1, there is shown a network environment diagram 100. The network environment 100 may include an electronic device 102, a personal mobility device 104, a server 106, a database 108, a set of electronic devices 110, and a set of personal mobility devices 112. The electronic device 102 may communicate with the personal mobility device 104 and other electronic devices such as the server 106, the database 108, and the set of electronic devices 110, through a communication network 114. The set of electronic devices 110 may include an electronic device-1 110A, an electronic device-2 110B, . . . and an electronic device-N 110N. The set of personal mobility devices 112 may include a personal mobility device-1 112A, a personal mobility device-2 112B, . . . and a personal mobility device-N 112N. In some embodiments, the electronic device 102 may be mounted on the personal mobility device 104. In some embodiments, each electronic device of the set of electronic devices 110 may be mounted on (or coupled with) a respective personal mobility device of the set of personal mobility devices 112. For example, the electronic device-1 110A may be mounted on (or coupled with) the personal mobility device-1 112A and the electronic device-2 110B may be mounted on (or coupled with) the personal mobility device-2 112B. Similarly, the electronic device-N 110N may be mounted on (or coupled with) the personal mobility device-N 112N. In FIG. 1, there is further shown, a user 116 who may be associated with the electronic device 102 and the personal mobility device 104. Also, there is further shown, a set of users 118 associated with the set of electronic devices 110 and the set of personal mobility devices 112. The set of users 118 may include a user-1 118A, a user-2 118B, . . . and a user-N 118N. The user-1 118A may be associated with the electronic device-1 110A and the personal mobility device-1 112A. Similarly, the user-2 118B may be associated with the electronic device-2 110B and the personal mobility device-2 112B, while the user-N 118N may be associated with the electronic device-N 110N and the personal mobility device-N 112N.

The N number of users, N number of electronic devices, and N number of personal mobility devices shown in FIG. 1 are presented merely as an example. The set of users 118, the set of electronic devices 110, and the set of personal mobility devices 112 may include only one or more than N users, electronic devices, and personal mobility devices, respectively, without deviation from the scope of the disclosure. For the sake of brevity, only N users (in the set of users 118), N electronic devices (in the set of electronic devices 110), and N personal mobility services (in the set of personal mobility devices 112) have been shown in FIG. 1. However, in some embodiments, there may be more than N users, more than N electronic devices and/or more than N personal mobility devices, without limiting the scope of the disclosure.

The electronic device 102 may include suitable logic, circuitry, interfaces, and/or code that may be configured to monitor a set of activities associated with the user 116. Further, the electronic device 102 may be configured to receive information associated with a usage of the personal mobility device 104, from the personal mobility device 104 and/or the server 106. The electronic device 102 may compare the information associated with the monitored set of activities with received information associated with the usage of the personal mobility device 104. Further, the electronic device 102 may generate one or more recommendations to promote usage of the personal mobility device 104 based on the comparison. Examples of the electronic device 102 may include, but are not limited to, a computing device, a desktop, a personal computer, a laptop, a computer workstation, a tablet computing device, a smartphone, a cellular phone, a mobile phone, an analytics engine, a consumer electronic (CE) device having a display, a television (TV), a wearable display, a head mounted display, a digital signage, a digital mirror (or a smart mirror), or an edge device connected to a user's home network or an organization's network.

The personal mobility device 104 may include suitable logic, circuitry, and interfaces that may be configured to monitor the usage of the personal mobility device 104 by the user 116. The personal mobility device 104 may determine the information associated with the usage of the personal mobility device 104. For example, the personal mobility device 104 may include one or more sensors to determine the information associated with the usage of the personal mobility device 104. The personal mobility device 104 may further transmit the information, associated with the usage of the personal mobility device 104, to the electronic device 102, the server 106, and/or the database 108. The personal mobility device 104 may be a non-autonomous vehicle, a semi-autonomous vehicle, or a fully autonomous vehicle, for example, as defined by National Highway Traffic Safety Administration (NHTSA). Examples of the personal mobility device 104 may include, but are not limited to, a e-kick scooter, a personal transporter, an electric scooter, an electric unicycle, an electric bicycle, an electric hover board, an electric skateboard, a roller skate, a compact four-wheeler vehicle, a compact three-wheeler vehicle, a two-wheeler vehicle, a wheelchair, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The personal mobility device 104 may be a system through which the user 116 may travel from a start point to a destination point. Examples of the compact four-wheeler vehicle may include, but are not limited to, an electric car, an internal combustion engine (ICE)-based car, a fuel-cell based car, a solar powered-car, or a hybrid car. Similarly, examples of the two-wheeler vehicle may include, but are not limited to, an electric two-wheeler, an internal combustion engine (ICE)-based two-wheeler, or a hybrid two-wheeler. The description of other types of the vehicles has been omitted from the disclosure for the sake of brevity.

The server 106 may include suitable logic, circuitry, interfaces, and/or code that may be configured to receive the information associated with the monitored set of activities, the information associated with the usage of the personal mobility device 104, information associated with monitored set of activities of the set of users 118, and information associated with usage of the set of personal mobility devices 112. The server 106 may provide the information associated with the usage of the personal mobility device 104 and the information associated with the usage of the set of personal mobility devices 112, to the electronic device 102 and the set of electronic devices 110. The information may be provided upon reception of requests from the electronic device 102 and the set of electronic devices 110. In an embodiment, the server 106 may store the one or more recommendations generated by the electronic device 102. The server 106 may execute operations through web applications, cloud applications, HTTP requests, repository operations, file transfer, and the like. Example implementations of the server 106 may include, but are not limited to, a database server, a file server, a web server, an application server, a mainframe server, a cloud computing server, or a combination thereof.

In at least one embodiment, the server 106 may be implemented as a plurality of distributed cloud-based resources by use of several technologies that are well known to those ordinarily skilled in the art. A person with ordinary skill in the art will understand that the scope of the disclosure may not be limited to the implementation of the server 106 and the electronic device 102 (or each electronic device of the set of electronic devices 110) as two separate entities. In certain embodiments, the functionalities of the server 106 can be incorporated in its entirety or at least partially in the electronic device 102 (or in at least one of the set of electronic devices 110), without a departure from the scope of the disclosure.

The database 108 may include suitable logic, interfaces, and/or code that may be configured to store the information associated with the monitored set of activities, the information associated with the usage of the personal mobility device 104, the information associated with the monitored set of activities of the set of users 118, and the information associated with the usage of the set of personal mobility devices 112. The database 108 may be derived from data off a relational or non-relational database or a set of comma-separated values (csv) files in conventional or big-data storage. The database 108 may be stored or cached on a device, such as the server 106 or the electronic device 102. The device storing the database 108 may be configured to receive a query for the information associated with the usage of the personal mobility device 104 and/or the information associated with the usage of the set of personal mobility devices 112 from the electronic device 102 and/or the set of electronic devices 110. In response, the server 106 of the database 108 may be configured to retrieve and provide the queried information associated with the usage of the personal mobility device 104 and the information associated with the usage of the set of personal mobility devices 112 to the electronic device 102 and/or the set of electronic devices 110 based on the received query.

In some embodiments, the database 108 may be hosted on a plurality of servers stored at same or different locations. The operations of the database 108 may be executed using hardware including a processor, a microprocessor (e.g., to perform or control performance of one or more operations), a field-programmable gate array (FPGA), or an application-specific integrated circuit (ASIC). In some other instances, the database 108 may be implemented using software.

Each electronic device in the set of electronic devices 110 may include suitable logic, circuitry, and interfaces that may be configured to monitor a set of activities associated with a corresponding user in the set of users 118, respectively. For example, the electronic device-1 110A may monitor a set of activities associated with the user-1 118A. Further, each electronic device in the set of electronic devices 110 may transmit information associated with the monitored set of activities associated with corresponding user in the set of users 118, to the electronic device 102, the server 106, and/or the database 108. In addition, each electronic device in the set of electronic devices 110 may receive information associated with a usage of a personal mobility device corresponding to a user associated with the particular electronic device. For example, the electronic device-1 110A may receive information associated with a usage of the personal mobility device-1 112A corresponding to the user-1 118A (i.e., associated with the electronic device-1 110A). Each electronic device in the set of electronic devices 110 may also transmit the received information associated with the usage of the personal mobility device (i.e., corresponding to the user associated with the particular personal mobility device) to the electronic device 102, the server 106, and/or the database 108. Similar to the electronic device 102, examples of each electronic device in the set of electronic devices 110 may include, but are not limited to, a computing device, a desktop, a personal computer, a laptop, a computer workstation, a tablet computing device, a smartphone, a cellular phone, a mobile phone, a CE device having a display, a TV, a wearable display, a head mounted display, a digital signage, a digital mirror (or a smart mirror), or an edge device connected to a user's home network or an organization's network.

Each personal mobility device in the set of personal mobility devices 112 may include suitable logic, circuitry, and interfaces that may be configured to monitor a usage of the particular personal mobility device by a corresponding user in the set of users 118. For example, the personal mobility device-1 112A may monitor a usage of the personal mobility device-1 112A by the user-1 118A who may be associated with the personal mobility device-1 112A. Each personal mobility device may transmit the information, associated with the usage of the particular personal mobility device, to a corresponding electronic device in the set of electronic devices 110, the server 106, and/or the database 108. For example, the personal mobility device-1 112A may transmit the information associated with the monitored usage of the personal mobility device-1 112A to the electronic device-1 110A, the server 106, and/or the database 108. Each of the set of personal mobility devices 112 may be a non-autonomous vehicle, a semi-autonomous vehicle, or a fully autonomous vehicle, for example, as defined by National Highway Traffic Safety Administration (NHTSA). Similar to the personal mobility device 104, examples of each personal mobility device in the set of personal mobility devices 112 may include, but are not limited to, an e-kick scooter, a personal transporter, an electric scooter, an electric unicycle, an electric bicycle, an electric hover board, an electric skateboard, a roller skate, a compact four-wheeler vehicle, a compact three-wheeler vehicle, a two-wheeler vehicle, a wheelchair, a hybrid vehicle, or a vehicle with autonomous drive capability that uses one or more distinct renewable or non-renewable power sources. A vehicle that uses renewable or non-renewable power sources may include a fossil fuel-based vehicle, an electric propulsion-based vehicle, a hydrogen fuel-based vehicle, a solar-powered vehicle, and/or a vehicle powered by other forms of alternative energy sources. The set of personal mobility devices 112 may be a system through which the set of users 118 may travel from a start point to a destination point. Examples of the four-wheeler vehicle may include, but are not limited to, an electric car, an ICE-based car, a fuel-cell based car, a solar powered-car, or a hybrid car. Similarly, examples of the two-wheeler vehicle may include, but are not limited to, an electric two-wheeler, an ICE-based two-wheeler, or a hybrid two-wheeler.

The communication network 114 may include a communication medium through which the electronic device 102, the personal mobility device 104, the server 106, the set of electronic devices 110, and the set of personal mobility devices 112, may communicate with each other. The communication network 114 may be one of a wired connection or a wireless connection. Examples of the communication network 114 may include, but are not limited to, the Internet, a cloud network, a Cellular or Wireless Mobile Network (such as a Long-Term Evolution and 5G New Radio), a Wireless Fidelity (Wi-Fi) network, a Personal Area Network (PAN), a Local Area Network (LAN), or a Metropolitan Area Network (MAN). Various devices in the network environment 100 may be configured to connect to the communication network 114 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may monitor a first set of activities (such as a standing activity, a sitting activity, a sleeping activity, or a walking activity), associated with the user 116. The first set of activities may be monitored for a predefined time period of observation (such as, a certain day(s), week(s), or month(s)). The electronic device 102 may be further configured to determine first information indicating a first time period associated with the monitored first set of activities. The first time period may be associated with the predefined time period as the user 116 may perform the monitored first set of activities for the first time period within the predefined time period of observation. The first information may further indicate one or more first geo-locations visited by the user 116 in the first time period, and a first distance covered by the user 116 in the first time period. Details pertaining to the monitoring of the first set of activities and determination of the first information are further provided, for example, in FIG. 4.

The electronic device 102 may be further configured to receive second information indicating a second time period associated with a usage of the personal mobility device 104 (such as, a portable electronic bike) to perform a second set of activities. The second information may be received from the personal mobility device 104. The second set of activities may include, for example, a travelling activity associated with the personal mobility device 104. The personal mobility device 104 may be utilized, by the user 116, to perform the second set of activities, i.e., travelling, for the second time period within the predefined time period of observation (such as, a certain day(s), week(s), or month(s)). The second information may further indicate one or more second geo-locations visited by the personal mobility device 104 during the second time period, or a second distance covered by the personal mobility device 104 during the second time period. The personal mobility device 104 may be configured to monitor the second set of activities to measure a distance covered by the personal mobility device 104 during specific time periods. The personal mobility device 104 may determine the one or more second geo-locations visited by the user 116 by use of the personal mobility device 104 and/or the second distance covered by the personal mobility device 104 to visit the one or more second geo-locations. The personal mobility device 104 may be further configured to determine the second information and transmit the determined second information to the electronic device 102. Details pertaining to the reception of the second information are further provided, for example, in FIG. 4.

The electronic device 102 may be further configured to compare the determined first information with the received second information. The first set of activities may be associated with the second set of activities. The association may be based on a comparative analysis between the first set of activities performed by the user 116 and the second set of activities performed by the user 116 by use of the personal mobility device 104. In an embodiment, the electronic device 102 may apply a neural network model (for example, a neural network model 210 of FIG. 2) to perform the comparison. The electronic device 102 may apply the neural network model on the determined first information and on the received second information. The comparison may include comparing the first time period with the second time period. In an embodiment, the comparison may result in determination of a ratio of the first time period and the second time period for the predefined time period of observation. The electronic device 102 may further compare the first distance with the second distance and compare the one or more first geo-locations with the one or more second geo-locations. For example, a walking activity of the user 116 for 10 minutes may be associated with a travelling activity of the personal mobility device 104 for 4 minutes, wherein a distance covered by the user 116 on foot while walking for 10 minutes may be same as a distance covered by the user 116 using the personal mobility device 104 for 4 minutes. Thus, the walking activity of the user 116 may be associated with the travelling activity of the personal mobility device 104 based on a ratio of "1:2.5", i.e., the personal mobility device 104 may cover "2.5" times more distance than the user 116 walking on foot. Details pertaining to the comparison of the first information and the second information are further provided, for example, in FIG. 4.

The electronic device 102 may be further configured to generate one or more recommendations associated with the usage of the personal mobility device 104 by the user 116. The one or more recommendations may be generated based on the comparison of the determined first information with the received second information. The electronic device 102 may generate the one or more recommendations to encourage the user 116 to perform a third set activities amongst the first set of activities in a third time period. For example, the electronic device 102 may recommend the user 116 to perform a walking activity if it is determined, based on the first information, that a time period of a sitting activity of the user 116 is greater than a threshold time period. The electronic device 102 may also generate one or more recommendations to promote the usage of the personal mobility device 104. For example, the electronic device 102 may generate a recommendation for the user 116 to visit a second set of geo-locations using the personal mobility device 104 in a fourth time period. The second set of geo-locations may be associated with a first set of geo-locations, where the first set of geo-locations are determined using the received second information. The first set of geo-locations may be determined based on the comparison of the one or more first geo-locations visited by the user 116 in the first time period with the one or more second geo-locations visited by the user 116, by use of the personal mobility device 104, in the second time period. In another example, the electronic device 102 may generate a recommendation for the user 116 to travel a third distance using the personal mobility device 104 in the fourth time period. Details pertaining to the generation of the one or more recommendations are further provided, for example, in FIGS. 4, 6, and 7. The electronic device 102 may be further configured to control a display device to display the generated one or more recommendations. The display device may be an inbuilt display screen of the electronic device 102 or a display screen communicatively coupled to with the electronic device 102. Details pertaining to the control of the display device to display the generated one or more recommendations are further provided, for example, in FIGS. 4, 6, and 7.

The disclosed electronic device 102 may monitor activities of the user 116 to determine information, indicating a first time period, associated with the monitored activities. The electronic device 102 may further receive usage information of the personal mobility device 104. The electronic device 102 may compare the determined information associated with the monitored activities with the received usage information of the personal mobility device 104. The comparison may result in a determination of an association between the activities of the user 116 and the usage of the personal mobility device 104 by the user 116. For example, if the time period associated with the activities of the user 116 is high compared to the time period associated with usage of the personal mobility device 104, the electronic device 102 may generate one or more recommendations that may encourage the user 116 to divert certain time towards the usage of the personal mobility device 104 as compared to the use of the time for the other activities of the user 116. Thus, the usage of the personal mobility device 104 may be promoted as compared to the other activities of the user 116. The personal mobility device 104 usage may thereby be promoted without an outlay of expenses for additional advertisements, offers, and research and development resources.

Figure 2:
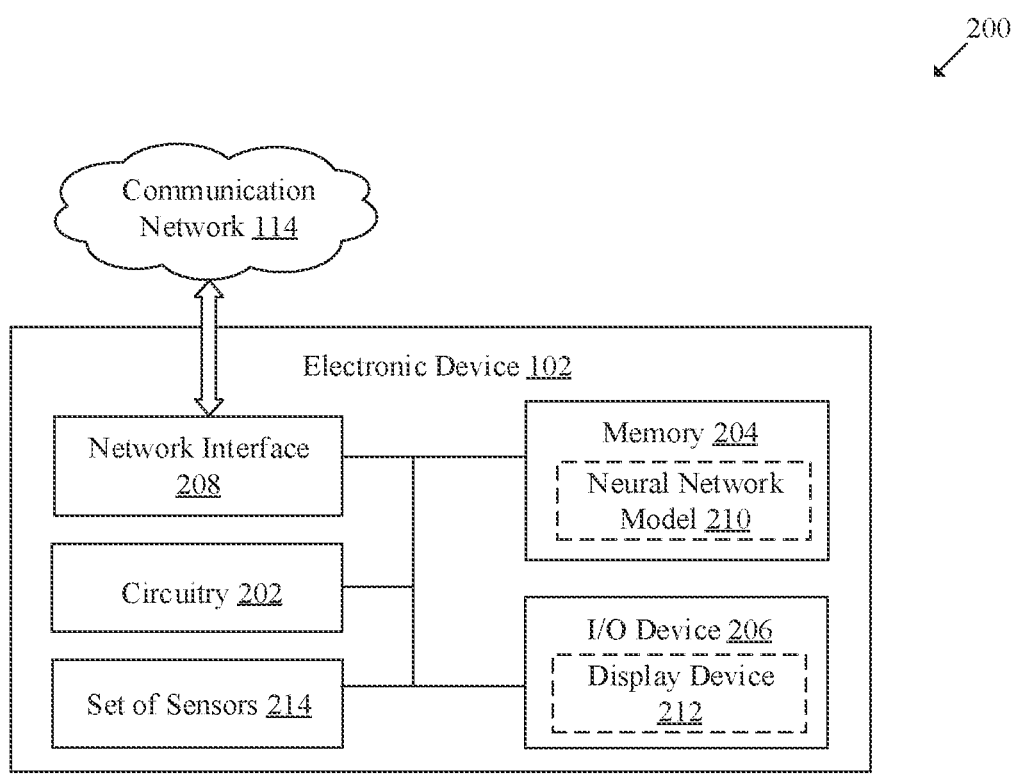
FIG. 2 is a block diagram that illustrates an exemplary electronic device of FIG. 1, for generation of personal mobility device-usage recommendations based on user activity tracking, in accordance with an embodiment of the disclosure.

FIG. 2 is a block diagram that illustrates an exemplary electronic device of FIG. 1, for generation of personal mobility device-usage recommendations based on user activity tracking, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, a network interface 208, and a set of sensors 214. In at least one embodiment, the memory 204 may also include a neural network model 210. In at least one embodiment, the I/O device 206 may also include a display device 212. The circuitry 202 may be communicatively coupled to the memory 204, the I/O device 206, the network interface 208, and the set of sensors 214 through wired or wireless communication of the electronic device 102. Although in FIG. 2, it is shown that the electronic device 102 includes the circuitry 202, the memory 204, the I/O device 206, the network interface 208, the neural network model 210, the display device 212, and the set of sensors 214; however, the disclosure may not be so limiting, and the electronic device 102 may include less or more components.

The circuitry 202 may include suitable logic, circuitry, and/or interfaces that may be configured to execute program instructions associated with different operations to be executed by the electronic device 102. The set of operations may include, but are not limited to, generation and storage of the neural network model 210, monitoring of the first set of activities (e.g., using the set of sensors 214), determination of the first information, reception of the second information, comparison of the determined first information with the received second information, generation of the one or more recommendations, and control of the display device 212. The circuitry 202 may include any suitable special-purpose or general-purpose computer, computing entity, or processing device including various computer hardware or software modules and may be configured to execute instructions stored on any applicable computer-readable storage media. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform or direct performance of any number of operations of the electronic device 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. In an embodiment, the memory 204 may include the neural network model 210. In at least one embodiment, the memory 204 may be configured to store the determined first information and the received second information. The memory 204 may be further configured to store the generated one or more recommendations. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. The I/O device 206 may include one or more input and output devices that may communicate with different components of the electronic device 102. For example, the I/O device 206 may receive user inputs from the user 116 to trigger the execution of program instructions, by the circuitry 202, associated with different operations to be executed by the electronic device 102. Examples of the I/O device 206 may include, but are not limited to, a touch screen, a keyboard, a mouse, a joystick, a microphone, the display device 212, and a speaker.

The network interface 208 may include suitable logic, circuitry, and interfaces that may be configured to facilitate communication between the circuitry 202, the personal mobility device 104, the server 106, the set of electronic devices 110, and the set of personal mobility devices 112, via the communication network 114. The network interface 208 may be implemented by use of various known technologies to support wired or wireless communication of the server 106 with the communication network 114. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, a wireless pear-to-pear protocol, a protocol for email, instant messaging, and a Short Message Service (SMS).

The neural network model 210, included in the memory 204, may be a computational network or a system of artificial neurons, arranged in a plurality of layers, as nodes. The plurality of layers of the neural network model 210 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model 210. Outputs of each hidden layer may be coupled to inputs of at least one node in other layers of the neural network model 210. Node(s) in the final layer may receive inputs from at least one hidden layer to output a result. The number of layers and the number of nodes in each layer may be determined from hyper-parameters of the neural network model 210. Such hyper-parameters may be set before, while training, or after training the neural network model 210 on a training dataset.

Each node of the neural network model 210 may correspond to a mathematical function (e.g., a sigmoid function or a rectified linear unit) with a set of parameters, tunable during training of the neural network model 210. The set of parameters may include, for example, a weight parameter, a regularization parameter, and the like. Each node may use the mathematical function to compute an output based on one or more inputs from nodes in other layer(s) (e.g., previous layer(s)) of the neural network model 210. All or some of the nodes of the neural network model 210 may correspond to same or a different same mathematical function. In training of the neural network model 210, one or more parameters of each node of the neural network model 210 may be updated based on whether an output of the final layer for a given input (from the training dataset) matches a correct result based on a loss function for the neural network model 210. The above process may be repeated for same or a different input till a minima of loss function may be achieved, and a training error may be minimized. Several methods for training are known in art, for example, gradient descent, stochastic gradient descent, batch gradient descent, gradient boost, meta-heuristics, and the like.

The neural network model 210 may include electronic data, which may be implemented as, for example, a software component of an application executable on the electronic device 102. The neural network model 210 may rely on libraries, external scripts, or other logic/instructions for execution by a processing device, such as the circuitry 202. The neural network model 210 may include code and routines configured to enable a computing device, such as the circuitry 202, to generate the one or more recommendations based on the determined first information and on the received second information provided to the neural network model 210. The neural network model 210 may compare the determined first information and the received second information to generate the one or more recommendations. Additionally, or alternatively, the neural network model 210 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model 210 may be implemented using a combination of hardware and software. Examples of the neural network model 210 may include, but are not limited to, a deep neural network (DNN), a convolutional neural network (CNN), an artificial neural network (ANN), a fully connected neural network, a deep Bayesian neural network, and/or a combination of such networks. (DNNs). In some embodiments, the neural network model 210 may correspond to a learning engine that may execute numerical computation techniques using data flow graphs. In certain embodiments, the neural network model 210 may be based on a hybrid architecture of multiple DNNs.

The I/O device 206 may include the display device 212. The display device 212 may include suitable logic, circuitry, and interfaces that may be configured to receive inputs from the circuitry 202 to render the generated one or more recommendations on a display screen of the display device 212. The generated one or more recommendations may correspond to a recommendation to visit a second set of geo-locations associated with a first set of geo-locations (i.e., determined based on the second information indicating the second time period which may be associated with the usage of a personal mobility device 104 to perform the second set of activities using the personal mobility device 104), or may correspond to a recommendation to travel a distance using the personal mobility device 104 in a time period. The display device 212 may be realized through several known technologies such as, but not limited to, at least one of a Liquid Crystal Display (LCD) display, a Light Emitting Diode (LED) display, a plasma display, or an Organic LED (OLED) display technology, or other display devices.

The set of sensors 214 may include suitable logic, circuitry, and interfaces that may be configured to monitor the first set of activities associated with the user 116. The first set of activities may include, but are not limited to, a standing activity, a sitting activity, a sleeping activity, a walking activity, a running activity, or a jogging activity, associated with the user 116. The set of sensors 214 may include, but are not limited to, wearable sensors (such as, bio-signal sensors), image capture devices, activity trackers, step trackers, heart rate monitors, pulse monitors, blood pressure monitor, oxygen concentration sensors, galvanic skin response sensors, sleep sensors, temperature sensors, sedentary sensors, motion sensors, accelerometers, or gyroscopes.

The wearable sensor may include suitable logic, circuitry, and interfaces that may be configured to receive a touch input of the user 116 via the electronic device 102. The received touch input may correspond to a human touch of the user 116 on a touch-sensitive region of the electronic device 102. In an embodiment, the wearable sensor may be configured to measure one or more health parameters associated with the user 116 to produce a set of bio-signals. The set of bio-signals may include for example, an electroencephalogram (EEG), an electrocardiogram (ECG), an electromyogram (EMG), a galvanic skin response (GSR) of the user 116, and the like.

In an embodiment, the wearable sensor may be in contact with at least one anatomical portion of the body of the user 116. In another embodiment, the wearable sensor may be a wrapped, wound, or strapped around the anatomical portion of the body. The wearable sensor may acquire multi-modal data through sensors, such as, but not limited to, a photoplethysmography (PPG) sensor, a temperature sensor, a blood pressure sensor, an ambient oxygen partial pressure (ppO2) sensor, or sensors which may collect somatic sensation information associated with the anatomical portion of the body. Example implementations of the wearable sensor may include, but are not limited to, a belt-type wearable sensor, a vest with embedded bio-sensors, a waist strap with embedded bio-sensors, a wrist strap with embedded bio-sensors, an instrumented wearable belt, a wearable garment with embedded bio-sensors, or a wearable article-of-manufacture having a retrofitting of bio-sensors.

Each of the image capture devices may include suitable logic, circuitry, and interfaces that may be configured to capture one or more images of the user 116. The circuitry 202 may be configured to control the image capture devices to capture the one or more images of the user 116 and transmit the captured one or more images to the electronic device 102. In an embodiment, circuitry 202 may determine a posture (e.g., a sitting posture, a sleeping posture, a standing posture) of the user 116 based on the captured one or more images of the user 116. Examples of image capture devices may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices. In some embodiments, the set of sensors 214 may be communicably coupled to the electronic device 102, rather than being included or integrated in the electronic device 102.

The functions or operations executed by the electronic device 102, as described in FIG. 1, may be performed by the circuitry 202. Operations executed by the circuitry 202 are described in detail, for example, in the FIGS. 4, 5, 6, and 7.

Figure 3:
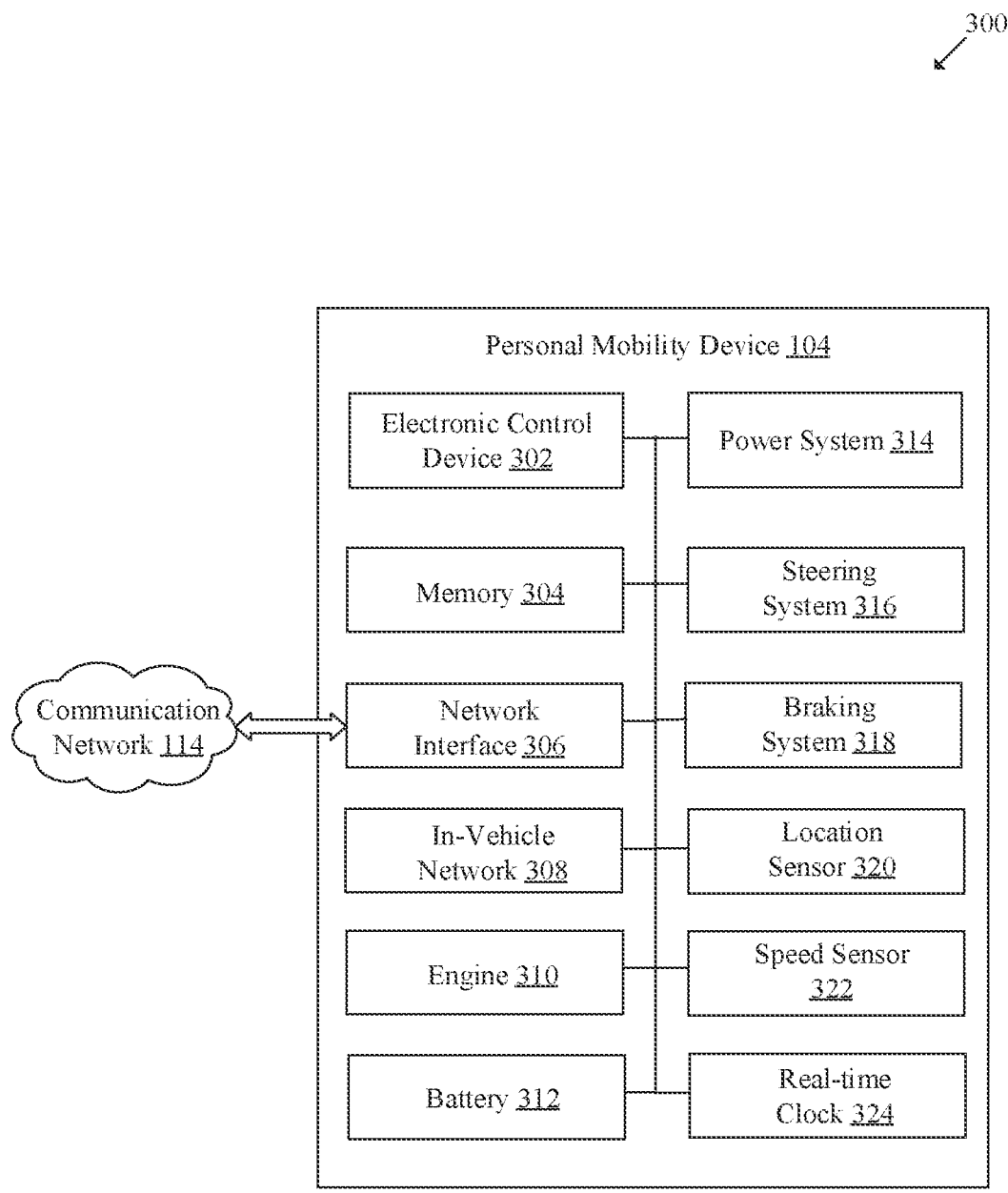
FIG. 3 is a block diagram that illustrates an exemplary personal mobility device of FIG. 1, in accordance with an embodiment of the disclosure.

FIG. 3 is a block diagram that illustrates an exemplary personal mobility device of FIG. 1, in accordance with an embodiment of the disclosure. FIG. 3 is explained in conjunction with elements from FIG. 1 and FIG. 2. With reference to FIG. 3, there is shown a block diagram 300 of the personal mobility device 104. The personal mobility device 104 may include, but is not limited to, an electronic control device 302, a memory 304, a network interface 306, an in-vehicle network 308, an engine 310, a battery 312, a power system 314, a steering system 316, a braking system 318, a location sensor 320, a speed sensor 322, and a real-time clock 324.

The electronic control device 302 may include suitable logic, circuitry, interfaces, and/or code that may be configured to monitor usage of the personal mobility device 104 by the user 116. The electronic control device 302 may be a specialized electronic circuitry that may include an electronic control unit (ECU) processor to control different functions, such as, but not limited to, engine operations, communication operations, and data acquisition of the personal mobility device 104. The electronic control device 302 may control the personal mobility device 104 to determine the second information indicating the second time period associated with the usage of the personal mobility device 104 to perform the second set of activities (e.g., a travelling activity). The electronic control device 302 may be configured to transmit the determined second information to the electronic device 102. The electronic control device 302 may be a microprocessor. Other examples of the electronic control device 302 may include, but are not limited to, a vehicle control system, an in-vehicle infotainment (IVI) system, an in-car entertainment (ICE) system, an automotive Head-up Display (HUD), an automotive dashboard, an embedded device, a smartphone, a human-machine interface (HMI), a computer workstation, a handheld computer, a cellular/mobile phone, a portable CE device, a server, and other computing devices.

The memory 304 may include suitable logic, circuitry, interfaces, and/or code that may be configured to store the set of instructions executable by the electronic control device 302. In at least one embodiment, the memory 304 may be configured to store the determined second information. Examples of implementation of the memory 204 may include, but are not limited to, RAM, ROM, a HDD, an SSD, a CPU cache, and/or a SD card.

The network interface 306 may include suitable logic, circuitry, and interfaces that may be configured to facilitate communication between the electronic control device 302 and the various devices or components of the environment 100 (such as, the electronic device 102, and the server 106), via the communication network 114. The network interface 306 may be implemented by use of various known technologies to support wired or wireless communication of the personal mobility device 104 with the communication network 114. The network interface 306 may include, but is not limited to, an antenna, a RF transceiver, one or more amplifiers, a tuner, one or more oscillators, a digital signal processor, a CODEC chipset, a SIM card, or a local buffer circuitry. The network interface 306 may be configured to communicate via wireless communication with networks, such as the Internet, an Intranet or a wireless network, such as a cellular telephone network, a wireless LAN, and a MAN. The wireless communication may be configured to use one or more of a plurality of communication standards, protocols and technologies, such as GSM, EDGE, W-CDMA, LTE, 5G NR, CDMA, TDMA, Bluetooth, Wi-Fi (such as IEEE 802.11a, IEEE 802.11b, IEEE 802.11g or IEEE 802.11n), VoIP, Li-Fi, Wi-MAX, a protocol for email, instant messaging, and a SMS.

The in-vehicle network 308 may include a medium through which the electronic control device 302, the memory 304, the engine 310, the battery 312, the power system 314, the steering system 316, the braking system 318, the location sensor 320, the speed sensor 322, and the real-time clock 324, may communicate with each other. In accordance with an embodiment, in-vehicle communication of audio/video data may occur by use of Media Oriented Systems Transport (MOST) multimedia network protocol of the in-vehicle network 308 or other suitable network protocols for vehicle communication. The MOST-based network may be a separate network from a controller area network (CAN). The MOST-based network may use a plastic optical fiber (POF) medium. In accordance with an embodiment, the MOST-based network, the CAN, and other in-vehicle networks may co-exist in a vehicle, such as the personal mobility device 104. The in-vehicle network 308 may facilitate access control and/or communication between the electronic control device 302 and other ECUs, such as ECM or a telematics control unit of the personal mobility device 104.

Various devices or components in the personal mobility device 104 may connect to the in-vehicle network 308, in accordance with various wired and wireless communication protocols. Examples of the wired and wireless communication protocols for the in-vehicle network 308 may include, but are not limited to, a vehicle area network (VAN), a CAN bus, Domestic Digital Bus (D2B), Time-Triggered Protocol (TTP), FlexRay, IEEE 1394, Carrier Sense Multiple Access With Collision Detection (CSMA/CD) based data communication protocol, Inter-Integrated Circuit (I2C), Inter Equipment Bus (IEBus), Society of Automotive Engineers (SAE) J1708, SAE J1939, International Organization for Standardization (ISO) 11992, ISO 11783, MOST, MOST25, MOST50, MOST150, Plastic optical fiber (POF), Power-line communication (PLC), Serial Peripheral Interface (SPI) bus, and/or Local Interconnect Network (LIN).

The engine 310 may be configured to provide power to the personal mobility device 104. The engine 310 may be an internal combustion engine with may execute operations, for example, fuel injection, compression, ignition, or emission to power and drive the personal mobility device 104. The engine 310 may include various parts, for example, but not limited to, a crankshaft, a cylinder, a spark plug, a piston, camshaft, a valve, combustion chamber, etc. In some embodiments, the engine 310 may include a motor in case of an electric motorcycle. The engine 310 may be two-stroke or four-stroke internal combustion engines. The engine 310 may include either one, two, three, four, or six cylinders. Examples of the engine 310 may include, but are not limited to, an inline engine (i.e., single cylinder, parallel twin, inline-triple, inline-four, inline-six), a V layout engine (i.e., V-twin engine, a V4 engine, a V8 engine), a flat (boxer) engine (i.e., flat-two, flat-four, flat-six), a lawn mower engine, a snow blower engine, or other motorcycle engines known in the art. A description of various parts of the engine 310 has been omitted from the disclosure for the sake of brevity.

The battery 312 may be a source of electric power for one or more electric circuits or loads in the personal mobility device 104. For example, the battery 312 may be a source of electrical power to the electronic control device 302, the memory 304, the network interface 306, the in-vehicle network 308, the engine 310, the battery 312, the power system 314, the steering system 316, the braking system 318, the location sensor 320, the speed sensor 322, and the real-time clock 324. The battery 312 may be a rechargeable battery. The battery 312 may be the source of electrical power to start the engine 310 of the personal mobility device 104. In some embodiments, the battery 312 may correspond to a battery pack, which may have a plurality of clusters of batteries, which may be surrounded by a suitable coolant and a charge controller. Examples of the battery 312 may include, but are not limited to, a lead acid battery, a nickel cadmium battery, a nickel-metal hydride battery, a lithium-ion battery, and other rechargeable batteries.

The power system 314 may include suitable logic, circuitry, interfaces, and/or code that may be configured to control electric power which may be output to various electric circuits and loads of the personal mobility device 104. The power system 314 may include a battery (such as the battery 312) to provide the electric power to perform various electrical operations of the personal mobility device 104. The power system 314 may provide the electric power for functioning of different components (such as the electronic control device 302, the memory 304, the network interface 306, the in-vehicle network 308, the engine 310, the battery 312, the power system 314, the steering system 316, the braking system 318, the location sensor 320, the speed sensor 322, and the real-time clock 324) of the personal mobility device 104. The power system 314 may be configured to receive control signals from the electronic control device 302 to control the various electric circuits and loads of the personal mobility device 104. The power system 314 may be configured to control the charging and the discharging of the battery 312 based on the received control signals. Examples of the power system 314 may include, but are not limited to, an electric charge/discharge controller, a charge regulator, a battery regulator, a battery management system, an electric circuit breaker, a power electronic drive control system, an Application-Specific Integrated Circuit (ASIC) processor, and/or other energy-control hardware processors.

The steering system 316 may receive one or more control commands from the electronic control device 302. The steering system 316 may include a steering wheel/handlebar and/or an electric motor (provided for a power-assisted steering) that may be used by the user 116 to control movement of the personal mobility device 104 in manual mode or a semi-autonomous mode. In accordance with an embodiment, the movement or steering of the personal mobility device 104 may be automatically controlled when the personal mobility device 104 is in autonomous mode. Examples of the steering system 316 may include, but are not limited to, an autonomous steering control, a power-assisted steering system, a vacuum/hydraulic-based steering system, an electro-hydraulic power-assisted system (EH-PAS), or a "steer-by-wire" system, or an autonomous steering system, known in the art.

The braking system 318 may be used to stop or slow down the personal mobility device 104 by application of resistive forces, such as electromagnetic and/or frictional forces. The braking system 318 may receive a command from a powertrain control system under the control of the electronic control device 302 when the personal mobility device 104 is in an autonomous mode or a semi-autonomous mode. In accordance with an embodiment, the braking system 318 may receive a command from the electronic control device 302, when the electronic control device 302 preemptively detects intent of the user 116 to perform a specific task which requires the user 116 to apply brakes.

The location sensor 320 may include suitable logic, circuitry, and/or interfaces that may be configured to determine a current geo-location of the personal mobility device 104. The location sensor 320 may be configured to determine a set of geolocations visited by the personal mobility device 104 in a certain time period. Examples of the location sensor 320, may include, but are not limited to, a Global Navigation Satellite System (GNSS)-based sensor of the personal mobility device 104. Examples of the GNSS-based sensor may include, but are not limited to, global positioning sensor (GPS), Global Navigation Satellite System (GLONASS), or other regional navigation systems or sensors.

The speed sensor 322 may include suitable logic, circuitry, interfaces, and/or code that may estimate a speed of the personal mobility device 104 in a direction of the motion of the personal mobility device 104. The speed may be determined based on a linear displacement of the personal mobility device 104 or an angular displacement of a front wheel of the personal mobility device 104. Example of the speed sensor 322 may include, but are not limited to, Hall effect sensors, variable reluctance speed sensors, Radio Frequency (RF) speed sensors, amplified (Active) speed sensors, Light Detection and Ranging (LiDAR) speed sensors, accelerometer-based speed sensors, optical speed sensors, and Antilock Braking System (ABS) speed sensors. In some embodiments, the speed sensor 322 may detect the speed based on engine revolutions, gear ratio, wheel rotation, and the like. Though not shown in FIG. 3, the personal mobility device 104 may further include an odometer to determine a distance that may be travelled by the personal mobility device 104 in a certain time period. In certain embodiments, the odometer may be integrated with the speed sensor 322.

The real-time clock 324 may include suitable logic, circuitry, interfaces, and/or code that may be configured to determine a current date-time of a current geo-location of the personal mobility device 104. Examples of the real-time clock 324 may include, but are not limited to, a crystal-based clock, a computer clock, and a radio-based clock.

Figure 4:
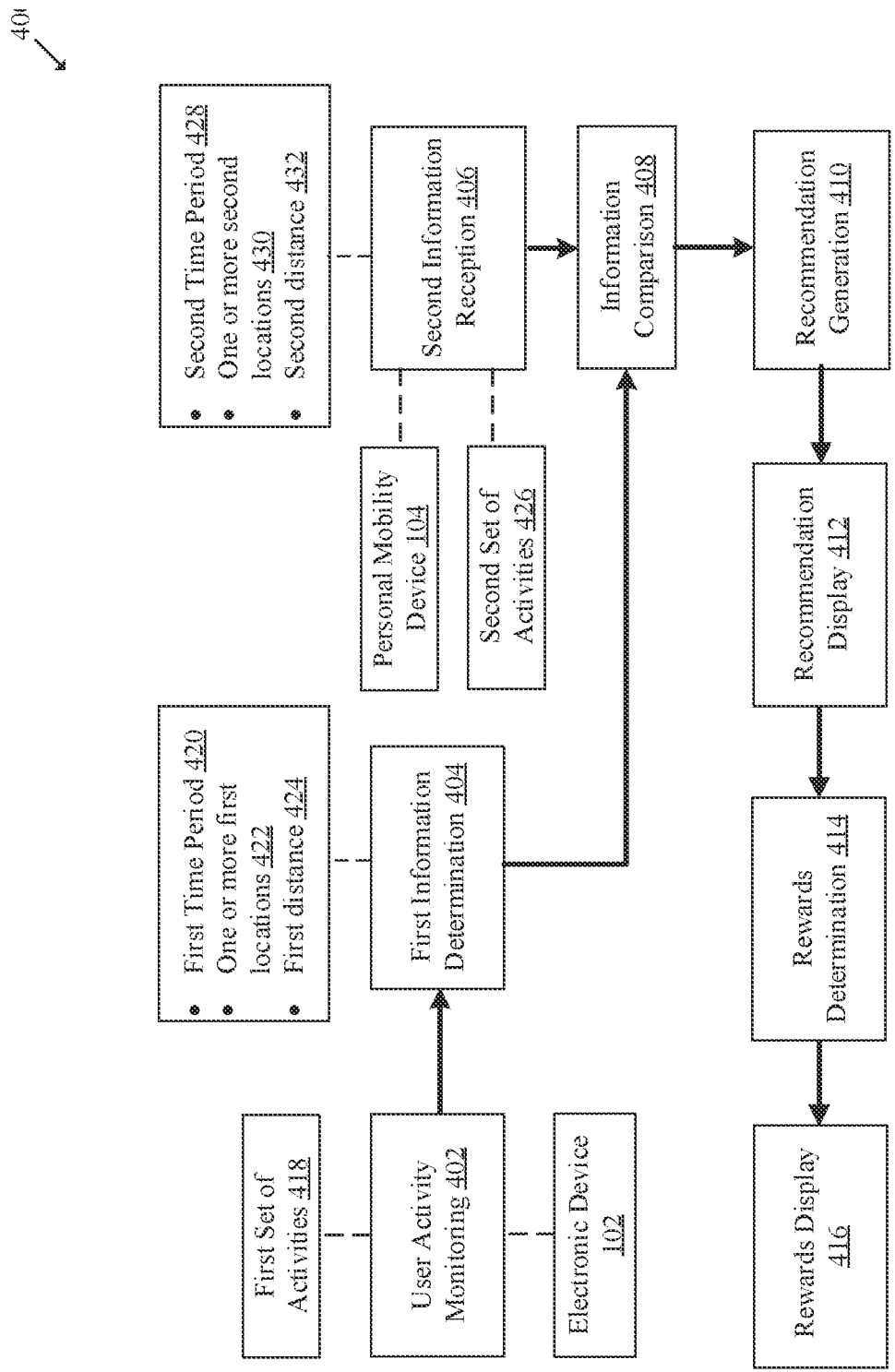
FIG. 4 is a diagram that illustrates an exemplary execution pipeline for recommendation generation and reward determination based on user activity tracking, in accordance with an embodiment of the disclosure.

FIG. 4 is a diagram that illustrates an exemplary execution pipeline for recommendation generation and reward determination based on user activity tracking, in accordance with an embodiment of the disclosure. FIG. 4 is explained in conjunction with elements from FIG. 1, FIG. 2, and FIG. 3. With reference to FIG. 4, there is shown an exemplary execution pipeline 400. The exemplary execution pipeline 400 may include a set of operations (such as, operations 402 to 416) that may be executed by one or more components of FIG. 1, such as, the electronic device 102 or by the circuitry 202 shown in FIG. 2. The set of operations may be performed by the electronic device 102 to generate recommendations based on user activity tracking and determine rewards for the user 116, as described herein.

At 402, the first set of activities (e.g., the first set of activities 418) associated with the user 116 may be monitored. The circuitry 202 may be configured to monitor the first set of activities 418 associated with the user 116. Examples of the first set of activities 418 may include, but are not limited to, a standing activity, a sitting activity, a sleeping activity, a walking activity, a running activity, or a jogging activity, associated with the user 116. In an embodiment, the set of sensors 214 may be configured to determine information associated with the first set of activities of the user 116. The circuitry 202 may be configured to monitor the first set of activities of the user 116 for a predefined time period (e.g., a certain number of hours, days, weeks, or months) based on the information associated with the first set of activities determined by the set of sensors 214.

For example, the set of sensors 214 may include wearable sensors and image capture devices. The image capture devices may capture a set of images of the user 116 for the predefined time period. The wearable sensors may determine a set of bio-signals associated with the user 116 for the same predefined time period. Examples of the set of bio-signals may include, but are not limited to, an EEG, an ECG, an EMG, a GSR, a PPG, a skin temperature, a blood pressure, a blood glucose level, a heart rate, a step count, a cadence, a blood oxygen concentration, somatic sensation information, sleep information, or any other physical activity information or health parameter of the user 116. The circuitry 202 may monitor the first set of activities of the user 116 based on the captured set of images of the user 116, the determined set of bio-signals of the user 116, or a combination thereof. For example, the circuitry 202 may determine a body pose/posture of the user 116 based on the captured set of images. Based on the determined body pose/posture, the circuitry 202 may monitor or determine the first set of activities of the user 116 as a standing posture, a sitting posture, a sleeping posture. In certain cases, the circuitry 202 may corroborate the monitored first set of activities of the user 116 based on the determined set of bio-signals of the user 116. For example, in case the posture of the user 116 is determined as a sitting posture and the pulse rate or heart rate of the user 116 is determined to be within a predetermined nominal range, the circuitry 202 may validate that the current activity of the user 116 is the sitting activity. In other cases, the determined body posture of the user 116 may not be sufficient to monitor the first set of activities. In such case, the determined set of bio-signals may be used to determine information that may be sufficient to monitor the first set of activities. For example, in case the posture of the user 116 is determined as a standing posture, the circuitry 202 may use the determined bio-signals (e.g., a pulse rate or a heart rate) and or other information (such as, information from an accelerometer) to determine whether the current activity of the user 116 is a running activity, a jogging activity, a walking activity, or a standing activity.

At 404, the first information indicating the first time period (i.e., associated with the monitored first set of activities 418) may be determined. The circuitry 202 may be configured to determine the first information indicating the first time period (e.g., a first time period 420) associated with the monitored first set of activities 418. For example, the first set of activities 418 monitored during the predefined time period (e.g., one day) of observation may include a standing activity, a sleeping activity, a sitting activity, a walking activity a running activity, or a jogging activity. In such scenario, the first time period 420 may include a time period (e.g., 7 hours) for which the user 116 performed the sleeping activity, a time period for which the user 116 performed the sitting activity (e.g., 11 hours), and a time period for which the user 116 performed the walking activity (e.g., 6 hours).

The first information may further indicate one or more first geo-locations 422 that may be visited by the user 116 in the first time period 420, and a first distance 424 that may be covered by the user 116 in the first time period 420. The user 116 may visit the one or more first geo-locations 422 and cover the first distance 424 by the walking activity, the running activity, the jogging activity, or the travelling activity that may be performed using foot of the user 116 or using a public transport vehicle (e.g., a bus, taxi, etc), and so on. For example, the circuitry 202 may be configured to determine, by the use of a location sensor (not shown in FIG. 2), the one or more first geo-locations 422 visited in the first time period 420. In an embodiment, the location sensor may be embedded in the electronic device 102 or may be associated with the electronic device 102. The location sensor of the electronic device 102 may be similar to the location sensor 320. Hence, details pertaining to the location sensor of the electronic device 102 are omitted for the sake of brevity.

In an embodiment, the circuitry 202 may be further configured to track, by the use of the location sensor, one or more first paths traversed by the user 116, during the first time period 420. The one or more first paths traversed by the user 116 may include the one or more first geo-locations 422. The electronic device 102 may determine, by use of the location sensor, one or more geo-locations (e.g., the one or more first geo-locations 422) that may be travelled in one or more first paths traversed by the user 116 in the first time period 420. The circuitry 202 may determine the first distance 424 based on the one or more first geo-locations 422 included in one or more first paths traversed by the user 116.

At 406, the second information may be received. The received second information may indicate the second time period (e.g., a second time period 428) associated with the usage of the personal mobility device 104 by the user 116, to perform the second set of activities (e.g., a second set of activities 426). The circuitry 202 may be configured to receive the second information indicating the second time period 428 from the personal mobility device 104. The second set of activities may include a travelling activity associated with the usage of the personal mobility device 104. The user 116 may perform the travelling activity by use of the personal mobility device 104 in the second time period 428.

The second information may further indicate one or more second geo-locations 430 visited in the second time period 428, and a second distance 432 covered in the second time period 428. The user 116 may visit the one or more second geo-locations 430 and cover the second distance 432 by use of the personal mobility device 104. The personal mobility device 104 may determine, by use of the location sensor 320, the one or more second geo-locations 430 visited in the second time period 428. The personal mobility device 104 may be further configured to track, by the use of the location sensor 320, one or more second paths traversed by the user 116, in the second time period 428. The one or more second paths may include the one or more second geo-locations 430. The personal mobility device 104 may determine the second distance 432 based on the one or more second geo-locations 430 included in the one or more second paths. In an embodiment, the personal mobility device 104 may determine the second distance 432 travelled by the personal mobility device 104 based on speed information provided by the speed sensor 322 at different timings within the second time period 428. The personal mobility device 104 may be further configured to transmit the determined the one or more second geo-locations 430 and/or the determined second distance 432 to the electronic device 102 as the second information.

The circuitry 202 may be further configured to determine a first set of geo-locations visited by the personal mobility device 104 in the second time period 428, based on the received second information. In an embodiment, the first set of geo-locations may include one or more second geo-locations 430 visited by the personal mobility device 104 in the second time period 428. The second distance 432 may be covered, in the second time period 428, by use of the personal mobility device 104 to visit the first set of geo-locations. The user 116 may use the personal mobility device 104 to visit the first set of geo-locations in a time period greater than or equal to the second time period 428.

At 408, the determined first information and the received second information may be compared. The circuitry 202 may be configured to compare the determined first information with the received second information. The first set of activities 418 may be associated with the second set of activities 426. The association of the first set of activities 418 with the second set of activities 426 may be based on a relationship between the first time period 420 (during which the first set of activities 418 are performed) and the second time period 428 (during which the second set of activities 426 are performed). In other words, the association may be based on a comparative analysis between the first set of activities 418 (for example a walking activity) performed by the user 116 in the first time period 420 and the second set of activities 426 (for example a travelling activity) performed by the user 116 by use of the personal mobility device 104 in the second time period 428. The circuitry 202 may compare the first time period 420 (indicated in the determined first information) with the second time period 428 (indicated in the received second information). The comparison may result in a determination of ratio of the first time period 420 and the second time period 428 for the predefined time period of observation. In an embodiment, the circuitry 202 may apply a neural network model (for example, the neural network model 210) to perform the comparison. The circuitry 202 may apply the neural network model 210 on the determined first information and on the received second information. For example, the circuitry 202 may determine a first weight associated with the first set of activities 418 and a second weight associated with the second set of activities 426 based on the application of the neural network model 210 on the first information and on the second information. The circuitry 202 may compare the first time period 420 and the second time period 428 based on a ratio of the first weight and the second weight. In the comparison, the circuitry 202 may further compare the first distance 424 with the second distance 432 and the one or more first geo-locations 422 with the one or more second geo-locations 430. For example, a walking activity of the user 116 for 10 minutes (i.e., first time period 420) may be associated with a travelling activity of the personal mobility device 104 for 4 minutes (i.e., second time period 428), wherein a distance covered by the user 116 on foot (i.e., while walking for 10 minutes) may be same as a distance covered by the user 116 using the personal mobility device 104 for 4 minutes. Thus, the walking activity of the user 116 may be associated with the travelling activity of the personal mobility device 104 based on a distance ratio of "1:2.5", i.e., the personal mobility device 104 may cover 2.5 times more distance than the user 116 walking on foot or the usage of the personal mobility device 104 may be 2.5 times faster than the user 116 walking on foot to perform certain activity or visit certain geo-locations.

At 410, the one or more recommendations associated with the usage of the personal mobility device 104, by the user 116, may be generated based on the comparison of the determined first information with the received second information. The circuitry 202 may be configured to generate the one or more recommendations associated with the usage of the personal mobility device 104 by the user 116, based on the comparison of the determined first information with the received second information.

In an embodiment, the generated one or more recommendations may correspond to a third set of activities, from the first set of activities 418, to be performed for a third time period. For example, the third set of activities may include the running activity, and the jogging activity. The circuitry 202 may be configured to apply the neural network model 210 on the determined first information and the received second information (as described at 408). The circuitry 202 may generate the one or more recommendations based on the application of the neural network model 210 on the determined first information and on the received second information. For example, the first time period 420 may be 8 hours and 45 minutes and the first set of activities 418 may include a sleeping activity of the user 116 for 7 hours, a sitting activity of the user 116 for 1 hour and a jogging activity of the user 116 for 45 minutes. In an embodiment, the neural network model 210 may classify the first set of activities 418 into a set of healthy activities (for example, the sleeping activity and the jogging activity) and a set of unhealthy activities (for example, the sitting activity). The neural network model 210 may assign a first weight to each of the set of healthy activities and a second weight to each of the set of unhealthy activities. The circuitry 202 may further determine a first ratio between the first weight and the second weight. Also, the circuitry 202 may determine a second ratio between a total time period associated with the set of healthy activities to a total time period associated with the set of unhealthy activities. The circuitry 202 may further compare the determined first ratio and the determined second ratio. For example, for the comparison, the circuitry 202 may determine a third ratio between the first ratio and the second ratio. The circuitry 202 may further generate the one or more recommendations based on the comparison between the first ratio and the second ratio. For example, the circuitry 202 may generate a recommendation to perform a healthy activity, such as, the jogging activity or the walking activity, for at least 60 minutes rather than the sitting activity. Herein, the 60 minutes may refer to the third time period.

For example, in case the assigned first weight is "0.2" and the second weight is "0.6", the first ratio may be determined as "0.33" (i.e., 0.2/0.6). Further, in case the total time period associated with the set of healthy activities is "1" hour and the total time period associated with the set of unhealthy activities in "1.5" hours (i.e., 1 hour 30 minutes), the second ratio may be determined as "0.66" (i.e., 1/1.5). In such case, the third ratio may be determined as the ratio between the first ratio and the second ratio, i.e., "0.5" (or 0.33/0.66). The third ratio may correspond to a ratio of recommended time period for the set of healthy activities (e.g., the jogging activity). For example, the circuitry 202 may determine the total time period associated with the set of healthy activities and the set of unhealthy activities as "2.5" hours. The circuitry 202 may further recommend the jogging activity (i.e., healthy activity) as the third set of activities for "0.5" hours (i.e., 1*0.5 hours), where "0.5" is the third ratio, and "1" hour is the total time period associated with the jogging activity. The circuitry 202 may recommend the user 116 to perform "1.5" hours (i.e., initial 1 hour+additional recommended "0.5" hour) of the jogging activity and perform "1" hour (i.e, instead of earlier "1.5" hours) of unhealthy activities.

In an embodiment, the generated one or more recommendations may include a recommendation to visit a second set of geo-locations associated with the first set of geo-locations using the personal mobility device 104 in a fourth time period, and/or a recommendation to travel a third distance using the personal mobility device 104 in the fourth time period. The circuitry 202 may indicate the second set of geo-locations in a recommendation based on the first set of geo-locations (determined from on the second information). The second set of geo-locations (such landmarks, point-of-interest, tourist places, and the like) may be in a vicinity of the first set of geo-locations. The circuitry 202 may generate the recommendation based on the comparison, by the neural network model 210, of the determined first information and the received second information. In an example, the determined first information may indicate that the user 116 performed a sitting activity, standing activity (i.e., such as standing in a queue), or walking activity for the first time period 420 (e.g., 1 hour). The received second information may indicate that the user 116 performed a travelling activity to visit the first set of geo-locations in the second time period 428 (e.g., 30 minutes) using the personal mobility device 104. In such scenario, the generated recommendation may indicate that the user 116 may also visit the second set of geo-locations (using the personal mobility device 104), in the vicinity (e.g., within a 5 km radius) of the first set of geo-locations, in the fourth time period (e.g., 15 minutes), as the second time period 428 taken to complete the second set of activities (i.e., travelling activity using the personal mobility device 104) is lesser than the first time period 420 taken by the user 116 to manually perform the first set of activities (such as walking). The fourth time period may be a portion of the first time period 420 (e.g., one fourth). In other words, the generated recommendation may indicate to the user 116 that the fourth time period (e.g., 15 minutes) out of the first time period 420 (e.g., the 1 hour used to perform sitting activity, standing activity, or walking activity manually) may be instead utilized for exploration of the second set of geo-locations using the personal mobility device 104 in addition to the visit of the first set of geo-locations in the second time period 428 (e.g., 30 minutes). Therefore, the disclosed electronic device 102, using the real-time comparative analysis of the monitored first set of activities and the second set of activities (i.e. performed using the personal mobility device 104), may automatically generate the recommendation for the user 116 to visit additional geo-locations using the personal mobility device 104 within the same first time period 420 in which the user 116 performed the first set of activities (i.e., without using the personal mobility device 104). Hence, the disclosed electronic device 102 may effectively encourage the usage of the personal mobility device 104 to the user 116, based on such real-time comparative analysis of the activities performed by the user 116.

The electronic device 102 may further indicate the third distance as the recommendation (i.e., the third distance to be covered in the fourth time period using the personal mobility device 104). The third distance may be covered in the fourth time period by visiting the second set of geo-locations (i.e. additional geo-locations) in the fourth time period by use of the personal mobility device 104. In an example, the determined first information may indicate that the user 116 performed a sitting activity or standing activity (i.e. such as standing in a queue) for the first time period 420 (e.g., 1 hour) and the received second information may indicate that the user 116 covered 20 kilometers (i.e., the second distance 432) to visit the first set of geo-locations in the second time period 428 (e.g., 30 minutes) using the personal mobility device 104. In such scenario, the generated recommendation may indicate that the user 116 may cover 10 kilometers (i.e., the third distance) using the personal mobility device 104 to visit the second set of geo-locations in the fourth time period (e.g., 15 minutes). The fourth time period (i.e., 15 minutes) may be a portion of the first time period 420 (i.e., 1 hour). In other words, the generated recommendation may indicate to the user 116 that the fourth time period (i.e., 15 minutes) out of the first time period 420 (i.e., the 1 hour used to perform sitting activity or the standing activity) may be instead utilized to cover the third distance (i.e., 10 km of additional distance) for exploration of the second set of geo-locations using the personal mobility device 104. Therefore, the disclosed electronic device 102, using the real-time comparative analysis of the monitored first set of activities (i.e. performed in the first time period 420) and the second set of activities (i.e. performed in the second time period 428 using the personal mobility device 104), may automatically generate the recommendation for the user 116 to cover the third distance (i.e. additional distance) using the personal mobility device 104 within the same first time period 420 in which the user 116 performed the first set of activities (i.e., without using the personal mobility device 104).

In another example, the user 116 may perform the walking activity for 1 hour and the jogging activity for 30 minutes (in the first time period 420 of 1 hour 30 minutes). Further, the user 116 may use the personal mobility device 104 for 10 minutes (i.e., the second time period 428) to perform the travelling activity. The circuitry 202 may track a geo-location of the user 116 (or of the electronic device 102) and determine a first destination at which the user 116 arrives by the walking activity. In such scenario, the circuitry 202 may generate a first recommendation for the user 116 to perform the jogging activity (an activity of the third set of activities) for at least 1 hour (i.e., the third time period). The circuitry 202 may further determine a second recommendation for the user 116 to use the personal mobility device 104 for 20 minutes (i.e., the fourth time period) to travel to the geo-location of the first destination. Herein, the neural network model 210 may compare the first time period 420 (i.e., 1 hour 30 minutes) with the second time period 428 (i.e., 10 minutes) and may determine that 20 minutes (i.e., the fourth time period) out of the 1 hour of the first time period 420 (i.e., used for walking) may be used to travel, by the personal mobility device 104, and 30 minutes (i.e., the third time period) out of the first time period 420 may be used to perform the jogging activities. In other words, the recommendation may indicate to the user 116 that if the jogging activity is performed for 30 mins and the personal mobility device 104 is used to travel for 20 minutes, the same distance may be travelled, and 40 minutes may be saved. In certain scenarios, the circuitry 202 may also recommend certain other activities that the user 116 may perform in the saved 40 minutes. For example, the user 116 may sit down, meditate, perform stretch exercises to relax and cool down, or perform any other personal or professional activity, due to the effective usage of the personal mobility device 104.

At 412, the generated one or more recommendations may be displayed. The circuitry 202 may be configured to control the display device 212 to display the generated one or more recommendations. For example, the circuitry 202 may control the display device 212 to display the generated one or more recommendations in a graphical representation (not shown) including statistical information associated with the recommended activities, recommended time periods to perform the activities, distances that may be covered, geo-locations that may be explored, time saved, other activities that may be performed in the saved time, and the like. The displayed one or more recommendations may motivate the user 116 to increase the usage of the personal mobility device 104, which may further lead to an increase in a revenue and reduction of marketing costs for an organization associated with a sale, repair, or service of the personal mobility device 104.

At 414, reward information may be determined. The circuitry 202 may be configured to determine the reward information based on a comparison of usage information received from the personal mobility device 104 and the generated one or more recommendations. The received usage information may be indicative of the usage of the personal mobility device 104 based on the generated one or more recommendations associated with the usage of the personal mobility device 104. In other words, the received usage information may indicate whether or how the personal mobility device 104 has been used by the user 116 after the receipt of the recommendations generated by the disclosed electronic device 102 based on the comparative analysis described, for example, at 408 in FIG. 4. The reward information may indicate, but is not limited to, physical trophies, payback points (that may be used for purchase), real cash, discount coupons, offers, product-previews, monetary benefits, and so on. In an embodiment, the circuitry 202 may be configured to receive information about a fifth time period associated with a usage of the personal mobility device 104 based on the generated one or more recommendations. The user 116 may have used the personal mobility device 104 to perform a travelling activity for the fifth time period, after the recommendations provided by the electronic device 102. The personal mobility device 104 may transmit information to the electronic device 102 about the usage of the personal mobility device 104 for the fifth time period. The travelling activity may be performed after the display of the generated one or more recommendations. The generated one or more recommendations may include a recommendation to perform the travelling activity (e.g., to visit the second set of geo-locations and/or travel a third distance), by use of the personal mobility device 104, for the fourth time period as described, for example, at 410 in FIG. 4. The circuitry 202 may be further configured to compare the received information about the fifth time period with the fourth time period Herein, the fourth time period is indicated in the generated recommendation for the user 116 to use the personal mobility device 104, and the fifth time period may indicate the actual usage of the personal mobility device 104 by the user 116, based on the provided recommendation. The circuitry 202 may be further configured to determine the reward information based on the comparison of the received fifth time period with the fourth time period. In an embodiment, the reward information may be determined if the fifth time period is greater than, or equal to, the fourth time period or equal a certain percent (e.g., 75%) of the fourth time period. For example, the reward information may indicate that the user 116 may be rewarded with 100 reward points in case the fifth time period is 110% of the fourth time period indicating that the user 116 has actually used the personal mobility device 104, as recommended by the electronic device 102 based on the comparative analysis of the first set of activities and the second set of activities of the user 116.

In another embodiment, the circuitry 202 may be configured to receive (i.e. from the personal mobility device 104) information about a fourth distance travelled by the usage of the personal mobility device 104 based on the generated one or more recommendations. The fourth distance may be travelled by the user 116 by use of the personal mobility device 104 for a certain time period (e.g., the fifth time period), after the recommendations provided by the electronic device 102. The circuitry 202 may be further configured to compare the received information about the fourth distance with the recommended third distance. Herein, the third distance is indicated in the generated recommendation for the user 116 to use the personal mobility device 104, and the information about the fourth distance may indicate the actual distance covered with the use of the personal mobility device 104 by the user 116, based on the provided recommendation. The circuitry 202 may be further configured to determine the reward information based on the comparison of the fourth distance with the third distance. In an embodiment, the reward information may be determined if the fourth distance is greater than, or equal to, the third distance or a certain percent (e.g., 75%) of the third distance. For example, the reward information may indicate that the user 116 may be rewarded with 100 reward points in case the fourth distance is, for example, 110% of the third distance indicating that the user 116 has actually covered certain distance using the personal mobility device 104, as recommended by the electronic device 102 based on the comparative analysis of the first set of activities and the second set of activities of the user 116.

In another embodiment, the circuitry 202 may be configured to receive information about a third set of geo-locations visited by the personal mobility device 104 based on the generated one or more recommendations. The user 116 may use the personal mobility device 104 to visit the third set of geo-locations in a certain time period (e.g., the fifth time period), after the recommendations provided by the electronic device 102. The personal mobility device 104 may transmit, to the electronic device 102, the information indicating the third set of geo-locations, that may be visited by use of the personal mobility device 104. The circuitry 202 may be further configured to compare the received information about the third set of geo-locations with the recommended second set of geo-locations. Herein, the second set of geo-locations is indicated in the generated recommendation for the user 116, to visit with the use the personal mobility device 104, and the information about the third set of geo-locations may indicate the actual geo-locations visited by the user 116 using the personal mobility device 104, based on the provided recommendation. The circuitry 202 may be further configured to determine the reward information based on the comparison of the received information about the third set of geo-locations with the recommended second set of geo-locations. In an embodiment, the reward information may be determined in case a number of locations in the third set of geo-locations is greater than or equal to a number of locations in the second set of geo-locations, or greater than a predefined threshold number of geo-locations. For example, if the number of locations in the second set of geo-locations is "6" and the predefined threshold number of geo-locations is "4", the reward information may be determined if the number of third set of geo-locations is greater than equal to "6' or greater than "4". For example, in such case, the reward information may indicate a reward of a certain number of points (e.g., 100 reward points) in case the number of locations in the third set of geo-locations is "5" or "6", indicating that the user 116 has actually used the personal mobility device 104 to visit certain number of geo-locations (i.e. third set of geo-locations) as recommended by the electronic device 102 in form the second set of geo-location, based on the comparative analysis of the first set of activities and the second set of activities of the user 116. It is to be noted that the reward information may be determined based on a combination of conditions (such as one or more of time period, distance, and or geo-locations visited).

In an embodiment, the circuitry 202 may be configured to receive information (e.g., from the personal mobility device 104) about a set of geo-locations visited by a usage of the personal mobility device 104 in a sixth time period. The sixth time period may be a period of observation of the usage of the personal mobility device 104. The circuitry 202 may be further configured to compare the information about the set of geo-locations and information about a set of predefined geo-locations. The user 116 may be recommended to visit the set of predefined geo-locations by the usage of the personal mobility device 104 in the sixth time period to earn rewards. In an example, the predefined geo-locations may be tourist sites, sites of importance, landmarks, a showroom, a shop, or a service station associated with the personal mobility device 104. The circuitry 202 may further determine, based on the comparison, whether the set of geo-locations (visited by the personal mobility device 104) includes some or all the of the set of predefined geo-locations. The electronic device 102 may determine the reward information if the set of visited geo-locations includes all the predefined geo-locations, or if a number of geo-locations in the set of visited geo-locations is equal to a predefined threshold number of geo-locations. For example, if the number of locations in the recommended set of predefined geo-locations is "6" and the predefined threshold number of geo-locations is "4", the reward information may be determined if the number of locations in the set of geo-locations (i.e. visited by the user 116 with the usage of the personal mobility device 104) is equal to "6" or greater than "4".

At 416, the determined reward information may be displayed. The electronic device 102 may be configured to control the display device 212 to display the determined reward information. For example, the circuitry 202 may control the display device 212 to display the reward information based on one or more of a time period, a distance travelled, and or geo-locations visited associated with the usage of the personal mobility device 104. The rewards may provide appropriate motivation to the user 116 to act upon the one or more recommendations displayed to the user 116. Based on the motivation and the rewards, the usage of the personal mobility device 104 by the user 116 may increase, which may further lead to a higher revenue, lower advertisement cost, and lower research and development outlay for an organization associated with the personal mobility device 104.

Figure 5:
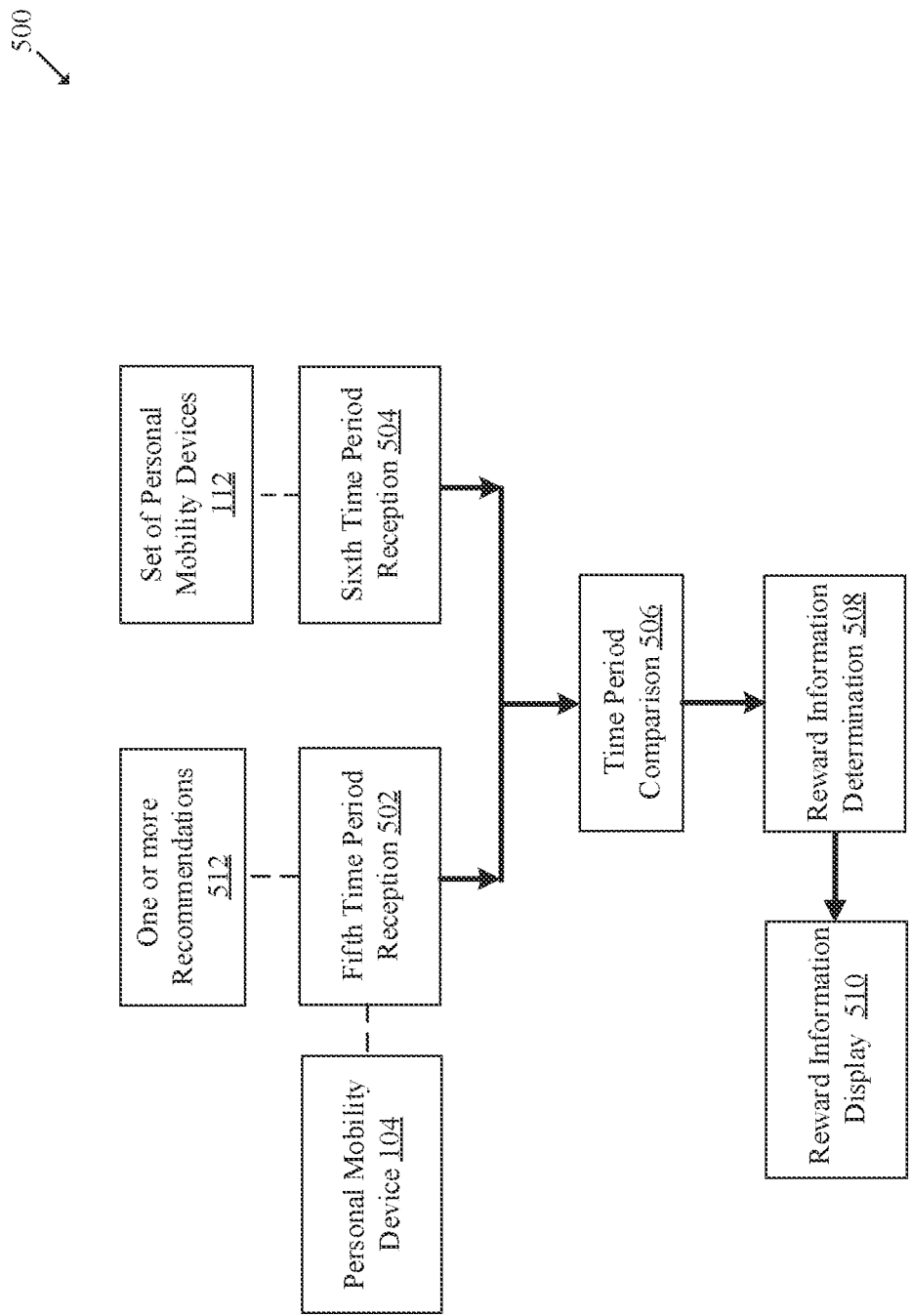
FIG. 5 is a diagram that illustrates an exemplary execution pipeline for reward determination based on multi-user activity tracking, in accordance with an embodiment of the disclosure.

FIG. 5 is a diagram that illustrates an exemplary execution pipeline for reward determination based on multi-user activity tracking, in accordance with an embodiment of the disclosure. FIG. 5 is explained in conjunction with elements from FIG. 1, FIG. 2, FIG. 3, and FIG. 4. With reference to FIG. 5, there is shown an exemplary execution pipeline 500. The exemplary execution pipeline 500 may include a set of operations (502 to 510) to that may be executed by one or more components of FIG. 1, such as, the electronic device 102 or by the circuitry 202 of FIG. 2. The set of operations may be performed by the electronic device 102 to determine rewards for the user 116, as described herein.

At 502, based on generated one or more recommendations 512, a fifth time period associated with a usage of the personal mobility device 104 may be received. The circuitry 202 may be configured to receive, from the personal mobility device 104, information about the fifth time period associated with the usage of the personal mobility device 104 based on the generated one or more recommendations 512. The one or more recommendations 512 may be generated based on the comparison of the first time period associated with the monitored first set of activities and the second time period associated with the usage of the personal mobility device 104 to perform the second set of activities, as described, for example, in FIG. 4. The personal mobility device 104 may monitor the usage of the personal mobility device 104, to perform a set of activities, after the generation of the one or more recommendations by the disclosed electronic device 102 and further transmit information including the fifth time period to the electronic device 102 based on the monitored usage.

At 504, a sixth time period, associated with a usage of each of the set of personal mobility devices 112 to perform the second set of activities, may be received. The circuitry 202 may be further configured to receive, from each of the set of personal mobility devices 112, the sixth time period which may be associated with the usage of each of the set of personal mobility devices 112 to perform the second set of activities by the corresponding set of users 118. In another embodiment, the sixth time period may be received from the server 106. Each personal mobility device (in the set of personal mobility devices 112) may transmit information indicating the sixth time period, to the server 106 The sixth time period may be associated with the usage of the corresponding personal mobility device (in the set of personal mobility devices 112) by a corresponding user (in the set of users 118) to perform the second set of activities In other words, the sixth time period indicates that how (and/or for how much time) different users (like the set of users 118 other than the user 116). have used their respective personal mobility device (i.e., the set of personal mobility devices 112). In some embodiments, the sixth time period received from the server 106 may be an average time period calculated based on the respective sixth time period received from each of the set of personal mobility devices 112 associated with the set of users 118.

At 506, the fifth time period may be compared with the sixth time period. The circuitry 202 may be further configured to compare the received information about the fifth time period with the received information about the sixth time period (associated with the usage of each of the set of personal mobility devices 112). The comparison may be performed to determine a comparative usage of the personal mobility device 104 with respect to a usage of one or more personal mobility devices of the set of personal mobility devices 112 (or an average usage of the set of personal mobility devices 112). For example, the fifth time period may indicate that the user 116 uses the personal mobility device 104 for 3 hours (say on a daily basis or in week), however the set of users 118 use their corresponding personal mobility device for an average of 6 hours (say on the daily basis or in the week) as the sixth time period.

At 508, based on the comparison of the received fifth time period and the received sixth time period (associated with the usage of each of the set of personal mobility devices 112), reward information may be determined. The circuitry 202 may be further configured to determine the reward information based on the comparison of the received fifth time period with the received sixth time period associated with the usage of each of the set of personal mobility devices 112. In an embodiment, the reward information may be determined if the fifth time period is greater than or equal to the average sixth time period or equal to a certain percent (e.g., 75%) of the average sixth time period. For example, the reward information may indicate that the user 116 is rewarded with certain rewards points in case the fifth time period is at least 80% of the sixth time period (or the average sixth time period). In some embodiments, the circuitry 202 may provide recommendation to the user 116 to further use the personal mobility device 104 for a higher time period, in case the fifth time period is significantly lower than the average sixth time period (i.e. indicating that the set of users 118 are using the corresponding personal mobility device 104) at higher usage than the user 116.

At 510, the determined reward information may be displayed. The circuitry 202 may be configured to control the display device 212 to display the determined reward information. The rewards may provide the user 116 a motivation or a sense of competition to use the personal mobility device 104 more than the other users (i.e., the users in the set of users 118). Based on the motivation and the rewards, the usage of the personal mobility device 104 by the user 116 may increase.

Figure 6:
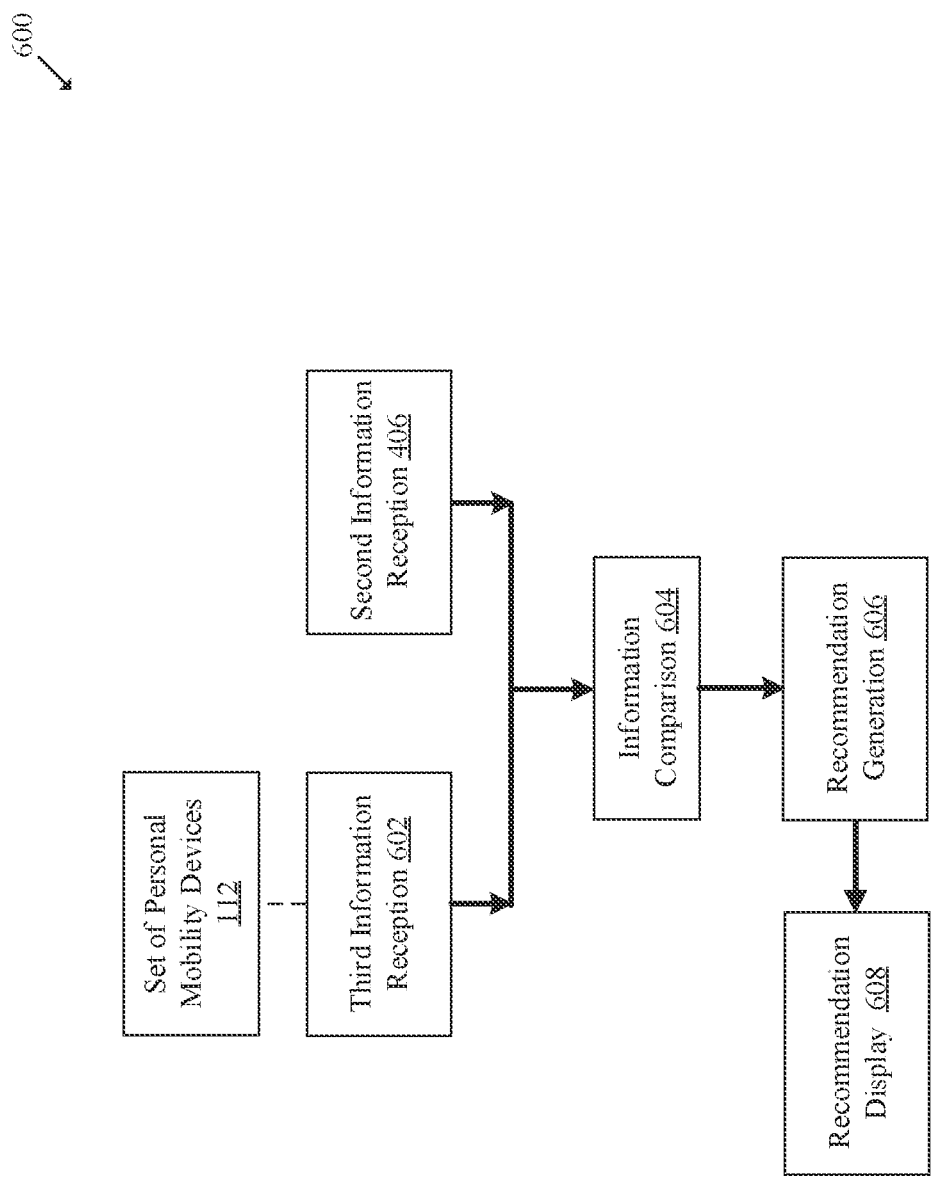
FIG. 6 is a diagram that illustrates a first exemplary execution pipeline for generation of recommendations based on multi-user activity tracking, in accordance with an embodiment of the disclosure.

FIG. 6 is a diagram that illustrates a first exemplary execution pipeline for generation of recommendations based on multi-user activity tracking, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary execution pipeline 600. The exemplary execution pipeline 600 may include a set of operations (602 to 608) to that may be executed by one or more components of FIG. 1, such as, the electronic device 102 or by the circuitry 202 of FIG. 2. The set of operations may be performed by the electronic device 102 to generate recommendations based on multi-user activity tracking, as described herein.

At 602, third information, indicating a sixth time period associated with a usage of each of the set of personal mobility devices 112 to perform the second set of activities, may be received. The circuitry 202 may be further configured to receive the third information indicating the sixth time period which may be associated with the usage of each of the set of personal mobility devices 112 by the set of users 118 to perform the second set of activities. One or more personal mobility devices of the set of personal mobility devices 112, associated with one or more users of the set of users 118, may provide the third information to the electronic device 102 (or to the circuitry 202).

In an embodiment, the electronic device 102 may receive the third information directly from the set of personal mobility devices 112. In another embodiment, the electronic device 102 may receive the third information from the server 106, if the one or more personal mobility devices transmit the third information to the server 106.

At 604, the received third information may be compared with the received second information (received at 406 as described in FIG. 4). The circuitry 202 may be configured to compare the received second information with the received third information. The received second information may indicate the second time period 428 (associated with the usage of the personal mobility device 104 to perform the second set of activities 426). In an embodiment, the second time period 428 may be compared with the sixth time period associated with the usage of individual personal mobility devices in the set of personal mobility devices 112 (such as the personal mobility device-1 112A, the personal mobility device-2 112B, and so on). In another embodiment, the electronic device 102 may determine an average sixth time period through computation of an average of the sixth time period associated with the usage of each of the set of personal mobility devices 112. The average sixth time period may be further compared with the second time period 428.

At 606, one or more recommendations, associated with the usage of the personal mobility device 104 by the user 116, may be generated. The circuitry 202 may be configured to generate the one or more recommendations associated with the usage of the personal mobility device 104 by the user 116, based on the comparison of the received second information with the received third information. The generation of the one or more recommendations based on the comparison of the received second information and the received third information may be similar to the generation of the one or more recommendations based on the comparison of the determined first information and the received second information, as described further, for example, in FIG. 4. Herein, the generated recommendation may be provided to the user 116 based on a determination that the user 116 is currently using the personal mobility device 104 for lesser time period (i.e. second information) as compared to the average time (i.e. third information) the set of users 118 have spent to use their respective set of personal mobility devices 112.

At 608, the generated one or more recommendations may be displayed. The circuitry 202 may be configured to control the display device 212 to display the generated one or more recommendations. For example, the circuitry 202 may control the display device 212 to display the generated one or more recommendations in a graphical representation including statistical information which may further indicate the recommended activities, recommended time periods to perform the activities, distances that may be covered, geolocations that may be explored, time saved, other activities that may be performed in the saved time, and the like. The displayed one or more recommendations may motivate and guide the user 116 to use the personal mobility device 104 more than the other users (i.e., the users in the set of users 118). Such motivation for the user 116 may further lead to an increase the usage of the personal mobility device 104, which may lead to an increase in a revenue and reduction of marketing costs associated with an organization associated with a sale, repair, or service of the personal mobility device 104.

Figure 7:
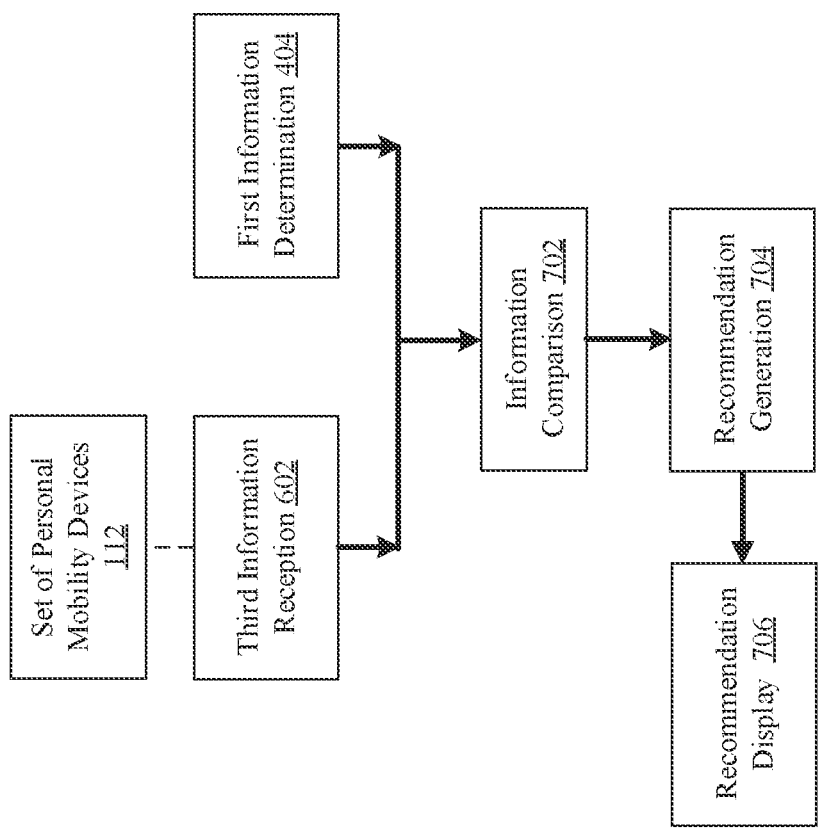
FIG. 7 is a diagram that illustrates a second exemplary execution pipeline for generation of recommendations based on multi-user activity tracking, in accordance with an embodiment of the disclosure.

FIG. 7 is a diagram that illustrates a second exemplary execution pipeline for generation of recommendations based on multi-user activity tracking, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown an exemplary execution pipeline 700. The exemplary execution pipeline 700 may include a set of operations (702 to 706) to that may be executed by one or more components of FIG. 1, such as, the electronic device 102 or by the circuitry 202 of FIG. 2. The set of operations may be performed by the electronic device 102 to generate recommendations based on multi-user activity tracking, as described herein.

At 702, the received third information (i.e. received at 602 as described in FIG. 6) may be compared with the determined first information (i.e. determined at 404 as described in FIG. 4). The circuitry 202 may be configured to compare the determined first information with the received third information. The first time period 420 (associated with the monitored first set of activities 418 performed by the user 116 in the first time period 420) may be included in the determined first information. Further, the received third information may include the sixth time period that may be associated with the usage of individual personal mobility devices in the set of personal mobility devices 112 (such as the personal mobility device-1 112A, the personal mobility device-2 112B, and so on). In an embodiment, the circuitry 202 may compare the first time period 420 with the sixth time period associated with the usage of individual personal mobility devices in the set of personal mobility devices 112. In another embodiment, the circuitry 202 compare the first time period 420 with the average sixth time period.

At 704, one or more recommendations, associated with the usage of the personal mobility device 104 by the user 116, may be generated. The circuitry 202 may be configured to generate the one or more recommendations associated with the usage of the personal mobility device 104 by the user 116, based on the comparison of the determined first information with the received third information. The generation of the one or more recommendations based on the comparison of the determined first information and the received third information may be similar to the generation of the one or more recommendations based on the comparison of the determined first information and the received second information, as described further, for example, in FIG. 4. The comparison between the first information and the third information may be performed by the disclosed electronic device 102 to identify whether or not the user 116 is spending higher time (i.e. as the first time period 420) to perform the first set of activities (i.e. without the use of the personal mobility device 104) as compared to the average third time period, which the set of users 118 may have spent with the respective usage of the set of personal mobility devices 112. In such case, the disclosed electronic device 102 may generate the recommendation of the user 116 to use the personal mobility device 104, as other users have used their set of personal mobility devices 112, rather than spending time on the first set of activities.

At 706, the generated one or more recommendations may be displayed. The circuitry 202 may be configured to control the display device 212 to display the generated one or more recommendations. For example, the circuitry 202 may control the display device 212 to display the generated one or more recommendations in a graphical representation including the statistical information that may indicate the recommended activities, recommended time periods to perform the activities, distances that may be covered, geo-locations that may be explored, time saved, other activities that may be performed in the saved time, and the like. The displayed one or more recommendations may further encourage the user 116 to use the personal mobility device 104 more than the other users (i.e., the users in the set of users 118).

Figure 8:
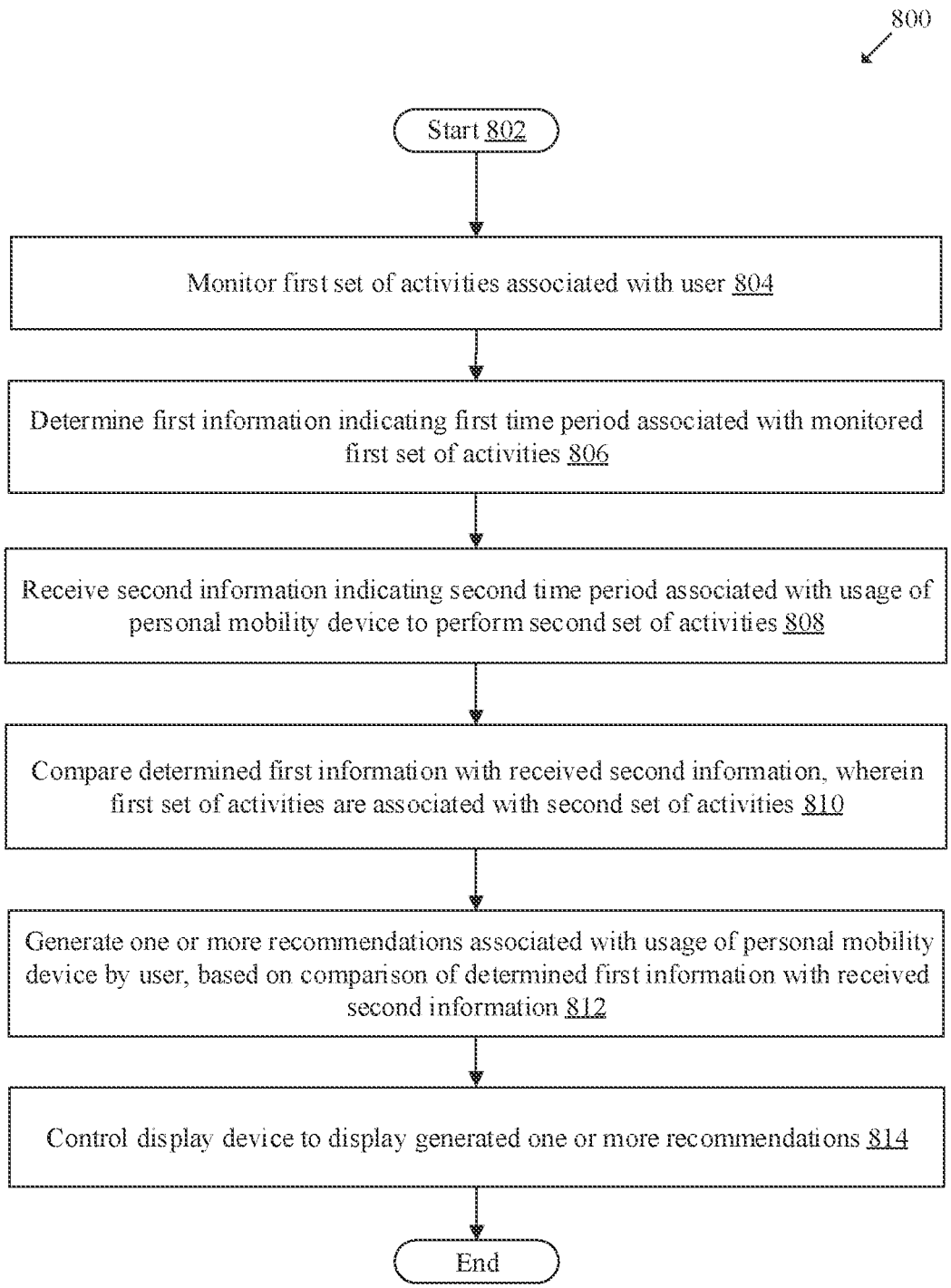
FIG. 8 is a flowchart that illustrates exemplary operations for generation of recommendations associated with usage of a personal mobility device based on user activity tracking, in accordance with an embodiment of the disclosure.

FIG. 8 is a flowchart that illustrates exemplary operations for generation of recommendations associated with usage of a personal mobility device based on user activity tracking, in accordance with an embodiment of the disclosure. With reference to FIG. 8, there is shown a flowchart 800. The flowchart 800 is described in conjunction with FIGS. 1, 2, 3, 4, 5, 6, and 7. The operations from 802 to 814 may be implemented, for example, by the electronic device 102 of FIG. 1 or the circuitry 202 of FIG. 2. The operations of the flowchart 800 may start at 802 and proceed to 804.

At 804, a first set of activities associated with the user may be monitored. In one or more embodiments, the circuitry 202 may be configured to monitor the first set of activities associated with the user 116. Details about the monitoring of the first set of activities are provided, for example, in FIG. 4 (at 402).

At 806, the first information indicating the first time period associated with the monitored first set of activities may be determined. In one or more embodiments, the circuitry 202 may be configured to determine the first information indicating the first time period associated with the monitored first set of activities. Details about the determination of the first information are provided, for example, in FIG. 4 (at 404).

At 808, the second information indicating the second time period, associated with the usage of the personal mobility device 104 to perform the second set of activities, may be received. In one or more embodiments, the circuitry 202 may be configured to receive from the personal mobility device 104, the second information indicating the second time period associated with the usage of the personal mobility device 104 by the user 116 to perform the second set of activities. Details about the reception of the second information are provided, for example, in FIG. 4 (at 406).

At 810, the determined first information and the received second information may be compared. Herein, the first set of activities may be associated with the second set of activities. In one or more embodiments, the circuitry 202 may be configured to compare the determined first information with the received second information. The circuitry 202 may be configured to apply the neural network model 210 on the determined first information and on the received second information to compare the determined first information with the received second information. Details about the comparison of the determined first information and the received second information are provided, for example, in FIG. 4 (at 408).

At 812, the one or more recommendations associated with the usage of the personal mobility device 104, by the user 116, may be generated based on the comparison of the determined first information with the received second information. In one or more embodiments, the circuitry 202 may be configured to generate the one or more recommendations associated with the usage of the personal mobility device 104 by the user 116, based on the comparison of the determined first information with the received second information. The circuitry 202 may be configured to generate the one or more recommendations based on the application of the neural network model 210 on the determined first information and on the received second information Details about the generation of the one or more recommendations are provided, for example, in FIG. 4 (at 410).

At 814, the display device 212 may be controlled to display the generated one or more recommendations. In one or more embodiments, the circuitry 202 may be configured to control the display device 212 to display the generated one or more recommendations.

Although the flowchart 800 is illustrated as discrete operations, such as 804, 806, 808, 810, 812, and 814, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (such as the electronic device 102) for generation of personal mobility device-usage recommendations based on user activity tracking. The set of instructions may be executable by the machine and/or the computer to perform operations that may include monitoring of a first set of activities associated with the user 116. The operations may further include determination of first information indicating a first time period associated with the monitored first set of activities. The operations may further include reception of second information indicating a second time period associated with the usage of the personal mobility device 104 to perform the second set of activities. The operations may further include comparison of the determined first information with the received second information. The first set of activities may be associated with the second set of activities. The operations may further include generation of the one or more recommendations associated with the usage of the personal mobility device 104 by the user 116, based on the comparison of the determined first information with the received second information. The operations may further include controlling of the display device 212 to display the generated of the one or more recommendations.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
   circuitry which:
   monitors a first set of activities associated with a user, wherein each of the first set of activities corresponds to a user activity different from a user activity associated with a personal mobility device of the user;
   determines first information indicating a first time period associated with the monitored first set of activities;
   receives second information indicating a second time period associated with a first usage of the personal mobility device to perform a second set of activities;
   compares the determined first information with the received second information, wherein the first set of activities are associated with the second set of activities;
   generates one or more recommendations associated with the first usage of the personal mobility device by the user, based on the comparison of the determined first information with the received second information; and
   controls a display device to display the generated one or more recommendations.

2. The electronic device according to claim 1, wherein the first information further indicates at least one of: one or more first geo-locations visited in the first time period, or a first distance covered in the first time period.

3. The electronic device according to claim 1, wherein the second information further indicates at least one of: one or more second geo-locations visited by the personal mobility device in the second time period, or a second distance covered by the personal mobility device in the second time period.

4. The electronic device according to claim 1, wherein the circuitry further:
   applies a neural network model on the determined first information and on the received second information; and
   generates the one or more recommendations based on the application of the neural network model on the determined first information and on the received second information.

5. The electronic device according to claim 1, wherein the generated one or more recommendations correspond to a third set of activities, from the first set of activities, to be performed for a third time period.

6. The electronic device according to claim 1, wherein the circuitry further determines a first set of geo-locations visited by the personal mobility device in the second time period, based on the received second information.

7. The electronic device according to claim 6, wherein the generated one or more recommendations correspond to at least one of: a recommendation to visit a second set of geo-locations associated with the first set of geo-locations using the personal mobility device in a third time period, or a recommendation to travel a third distance using the personal mobility device in the third time period.

8. The electronic device according to claim 7, wherein the circuitry further:
   receives a fourth time period associated with a second usage of the personal mobility device based on the generated one or more recommendations;
   compares the received fourth time period with the third time period;
   determines reward information based on the comparison of the received fourth time period with the third time period; and
   controls the display device to display the determined reward information.

9. The electronic device according to claim 7, wherein the circuitry further:
   receives a fourth distance travelled with a second usage of the personal mobility device based on the generated one or more recommendations;
   compares the received fourth distance with the recommended third distance;
   determines reward information based on the comparison of the received fourth distance and the recommended third distance; and
   controls the display device to display the determined reward information.

10. The electronic device according to claim 7, wherein the circuitry further:
    receives a third set of geo-locations visited by the personal mobility device based on the generated one or more recommendations;
    compares the received third set of geo-locations with the recommended second set of geo-locations;

determines reward information based on the comparison of the received third set of geo-locations with the recommended second set of geo-location; and controls the display device to display the determined reward information.

11. The electronic device according to claim 1, wherein the circuitry further:

receives a third time period associated with a second usage of the personal mobility device based on the generated one or more recommendations;

receives a fourth time period associated with a third usage of each of a set of personal mobility devices to perform the second set of activities, wherein the set of personal mobility devices are associated with a set of users different from the user associated with the personal mobility devices;

compares the received third time period with the received fourth time period;

determines reward information based on the comparison of the received third time period and the received fourth time period; and controls the display device to display the determined reward information.

12. The electronic device according to claim 1, wherein the circuitry further:

receives information about a set of geo-locations visited by a second usage of the personal mobility device in a third time period;

compares the information about the set of geo-locations and information about a set of predefined geo-locations;

determines reward information based on the comparison of the information about the set of geo-locations and the information about the set of predefined geo-locations; and controls the display device to display the determined reward information.

13. The electronic device according to claim 1, wherein the circuitry further:

receives third information indicating a third time period associated with a second usage of each of a set of personal mobility devices to perform the second set of activities, wherein the set of personal mobility devices are associated with a set of users different from the user associated with the personal mobility device; and compares the received second information with the received third information, wherein the generation of the one or more recommendations associated with the first usage of the personal mobility device by the user is further based on the comparison of the received second information with the received third information.

14. The electronic device according to claim 1, wherein the circuitry further:

receives third information indicating a third time period associated with a second usage of each of a set of personal mobility devices to perform the second set of activities, wherein the set of personal mobility devices are associated with a set of users different from the user associated with the personal mobility device; and compares the determined first information with the received third information, wherein the generation of the one or more recommendations associated with the first usage of the personal mobility device by the user is further based on the comparison of the determined first information with the received third information.

15. The electronic device according to claim 1, wherein the first set of activities includes at least one of: a standing activity, a sitting activity, a sleeping activity, a walking activity, a running activity, or a jogging activity, associated with the user.

16. The electronic device according to claim 1, wherein the second set of activities includes a travelling activity associated with the personal mobility device.

17. The electronic device according to claim 1, wherein the generated one or more recommendations include information to recommend the user to increase the first usage of the personal mobility device by the user.

18. A method, comprising:

in an electronic device:

monitoring a first set of activities associated with a user, wherein each of the first set of activities corresponds to a user activity different from a user activity associated with a personal mobility device of the user;

determining first information indicating a first time period associated with the monitored first set of activities;

receiving second information indicating a second time period associated with a usage of the personal mobility device to perform a second set of activities;

comparing the determined first information with the received second information, wherein the first set of activities are associated with the second set of activities;

generating one or more recommendations associated with the usage of the personal mobility device by the user, based on the comparison of the determined first information with the received second information; and controlling a display device to display the generated one or more recommendations.

19. The method according to claim 18, further comprising determining a first set of geo-locations visited by the personal mobility device in the second time period, based on the received second information.

20. The method according to claim 19, wherein the generated one or more recommendations correspond to at least one of: a recommendation to visit a second set of geo-locations associated with the first set of geo-locations using the personal mobility device in a third time period, or a recommendation to travel a third distance using the personal mobility device in the third time period.

21. A non-transitory computer-readable storage medium configured to store instructions that, in response to being executed, causes an electronic device to perform operations, the operations comprising:

monitoring a first set of activities associated with a user, wherein each of the first set of activities corresponds to a user activity different from a user activity associated with a personal mobility device of the user;

determining first information indicating a first time period associated with the monitored first set of activities;

receiving second information indicating a second time period associated with a usage of the personal mobility device to perform a second set of activities;

comparing the determined first information with the received second information, wherein the first set of activities are associated with the second set of activities;

generating one or more recommendations associated with the usage of the personal mobility device by the user, based on the comparison of the determined first information with the received second information; and controlling a display device to display the generated one or more recommendations.

\* \* \* \* \*